US011749104B2

(12) United States Patent
Choi et al.

(10) Patent No.: US 11,749,104 B2
(45) Date of Patent: Sep. 5, 2023

(54) ELECTRONIC DEVICE AND METHOD FOR PROVIDING V2X SERVICE USING SAME

(71) Applicant: SAMSUNG ELECTRONICS CO., LTD., Suwon-si (KR)

(72) Inventors: Areum Choi, Suwon-si (KR); Inyoung Choi, Suwon-si (KR); Seungcheol Lee, Suwon-si (KR); Jehyun Lee, Suwon-si (KR); Kiho Cho, Suwon-si (KR); Hyoungtak Cho, Suwon-si (KR); Jongsung Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

(21) Appl. No.: 17/416,178

(22) PCT Filed: Dec. 12, 2019

(86) PCT No.: PCT/KR2019/017582
§ 371 (c)(1),
(2) Date: Jun. 18, 2021

(87) PCT Pub. No.: WO2020/130485
PCT Pub. Date: Jun. 25, 2020

(65) Prior Publication Data
US 2022/0051558 A1 Feb. 17, 2022

(30) Foreign Application Priority Data
Dec. 19, 2018 (KR) .................. 10-2018-0164914

(51) Int. Cl.
G08G 1/005 (2006.01)
H04W 4/40 (2018.01)

(52) U.S. Cl.
CPC .............. G08G 1/005 (2013.01); H04W 4/40 (2018.02)

(58) Field of Classification Search
CPC ........ G08G 1/005; G08G 1/087; G08G 1/093; G08G 1/095; G08G 1/09; G08G 1/08; H04W 4/40; H04W 4/90; H04W 4/021
See application file for complete search history.

(56) References Cited

U.S. PATENT DOCUMENTS 9,460,613 B1 * 10/2016 Whiting ............... G06V 10/764
9,607,402 B1 * 3/2017 Whiting ............... G06V 10/50
(Continued)

FOREIGN PATENT DOCUMENTS

EP 3 360 350 8/2018
JP 2002-352379 12/2002
(Continued)

OTHER PUBLICATIONS

Extended Search Report dated Dec. 16, 2021 in corresponding EP Application No. 19897768.8.
(Continued)

Primary Examiner — An T Nguyen
(74) Attorney, Agent, or Firm — Nixon & Vanderhye, P.C.

(57) ABSTRACT

According to various embodiments of the present invention, an electronic device comprises: a communication circuit, a display, a processor operatively connected to the communication circuit and the display, and a memory operatively connected to the processor, wherein the memory, when executed, stores instructions for causing the processor to: receive a message for signal information related to walking from an external electronic device through the communication circuit; display, on the display, a first user interface for the received signal information related to walking; receive a message about signal information related to walking that has been changed according to a designated condition from the external electronic device through the communication circuit while displaying the first user interface; and displaying, (Continued)

on the display, a second user interface for the changed signal information related to walking. Other various embodiments, other than the various embodiments disclosed in the present invention, are possible.

14 Claims, 16 Drawing Sheets

(56) References Cited

U.S. PATENT DOCUMENTS

| | | | |
|---|---|---|---|
| 10,255,805 B1* | 4/2019 | Wolf | G08G 1/09626 |
| 11,055,991 B1* | 7/2021 | Mulligan | G08G 1/095 |
| 2006/0197684 A1* | 9/2006 | Tremblay | G08G 1/07 340/929 |
| 2011/0196580 A1* | 8/2011 | Xu | B60K 35/00 340/905 |
| 2012/0326892 A1 | 12/2012 | Sennett et al. | |
| 2013/0069799 A1* | 3/2013 | Ma | G08G 1/07 340/907 |
| 2013/0135117 A1* | 5/2013 | Morimoto | G08G 1/092 340/905 |
| 2014/0139358 A1* | 5/2014 | Lee | G08G 1/092 340/907 |
| 2014/0159924 A1* | 6/2014 | Lee | G08G 1/095 340/907 |
| 2015/0084791 A1 | 3/2015 | Jang | |
| 2016/0284215 A1* | 9/2016 | Ova | G06V 20/584 |
| 2017/0092126 A1* | 3/2017 | Oshida | G08G 1/005 |
| 2018/0165500 A1* | 6/2018 | Glickman | H04N 23/63 |
| 2018/0174449 A1* | 6/2018 | Nguyen | G08G 1/0104 |
| 2018/0295474 A1 | 10/2018 | Lee et al. | |
| 2019/0035263 A1* | 1/2019 | Loes | G08G 1/095 |
| 2019/0082377 A1* | 3/2019 | Silver | H04W 4/027 |
| 2019/0122548 A1* | 4/2019 | Sakuma | G08G 1/08 |
| 2019/0208432 A1* | 7/2019 | Carney Landow | G08G 1/0129 |
| 2019/0251838 A1* | 8/2019 | Bernhardt | G08G 1/087 |
| 2019/0311619 A1* | 10/2019 | Tao | G08G 1/0145 |
| 2019/0355248 A1* | 11/2019 | Grant | G08G 1/005 |
| 2020/0008027 A1* | 1/2020 | Yabuuchi | G08G 1/096725 |
| 2020/0074846 A1* | 3/2020 | York | G08G 1/095 |
| 2020/0160072 A1* | 5/2020 | Slater | G06T 7/20 |
| 2022/0051558 A1* | 2/2022 | Choi | H04W 4/40 |

FOREIGN PATENT DOCUMENTS

| | | |
|---|---|---|
| JP | 2008-129613 | 6/2008 |
| KR | 10-1769897 | 8/2017 |
| KR | 10-2018-0046131 | 5/2018 |
| KR | 10-1866041 | 6/2018 |
| KR | 10-1910121 | 10/2018 |
| WO | 2017/061795 | 4/2017 |
| WO | 2018/128946 | 7/2018 |

OTHER PUBLICATIONS

International Search Report for PCT/KR2019/017582 dated Apr. 2, 2020, 5 pages.
Written Opinion of the ISA for PCT/KR2019/017582 dated Apr. 2, 2020, 4 pages.

* cited by examiner

FIG. 12
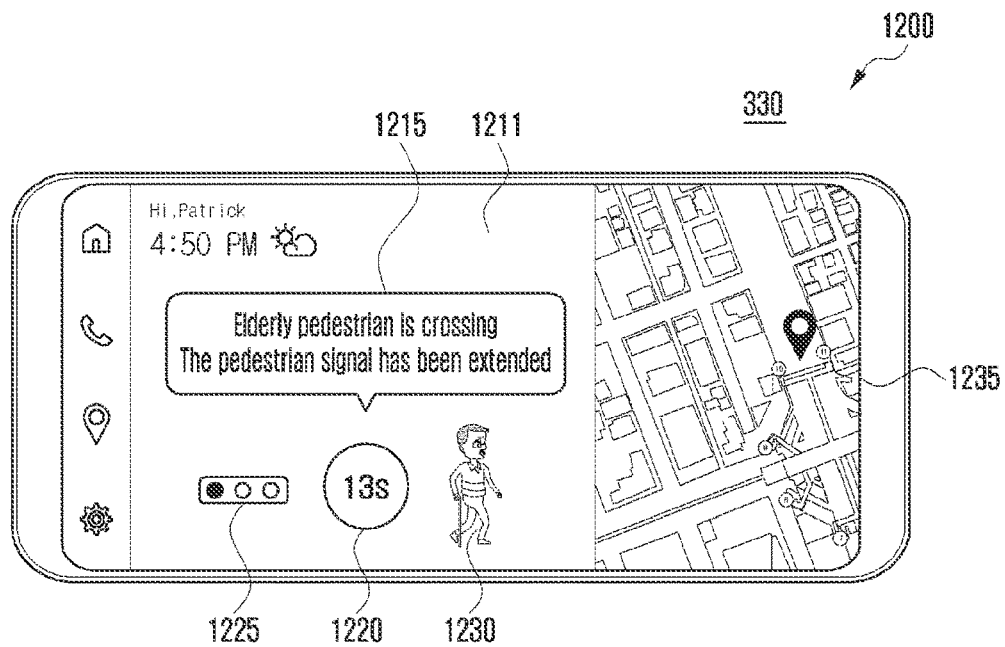
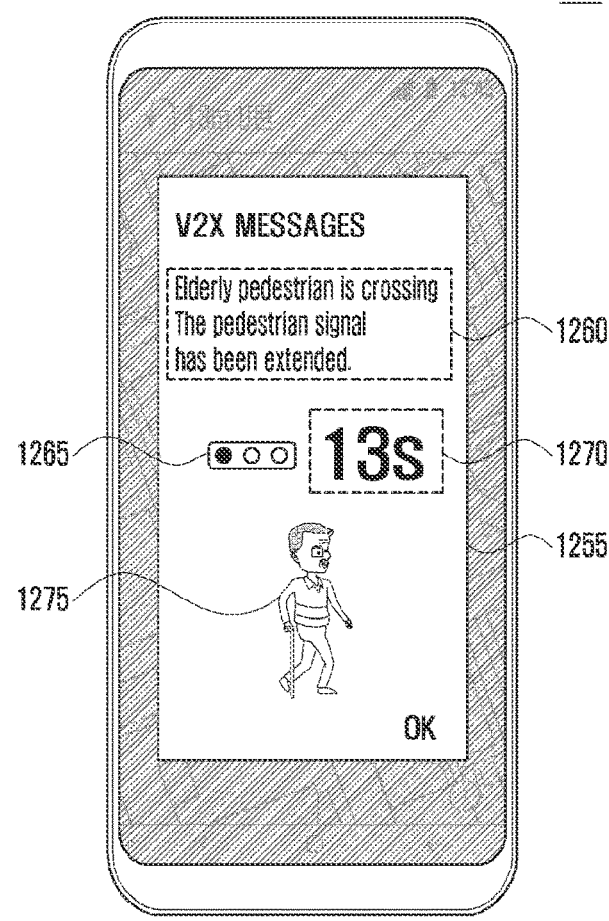

ELECTRONIC DEVICE AND METHOD FOR PROVIDING V2X SERVICE USING SAME

This application is the U.S. national phase of International Application No. PCT/KR2019/017582 filed Dec. 12, 2019 which designated the U.S. and claims priority to KR Patent Application No. 10-2018-0164914 filed Dec. 19, 2018, the entire contents of each of which are hereby incorporated by reference.

BACKGROUND

Various embodiments of the disclosure relate to an electronic device and a method for providing a V2X service using the same.

DESCRIPTION OF RELATED ART

Vehicle to everything (V2X) is a communication technology to exchange information, such as traffic information, with things with infrastructure, such as another vehicle or a road, through a wired/wireless network during vehicle driving, and may include vehicle to vehicle (V2V), vehicle to pedestrian (V2P), vehicle to infrastructure (V2I), and vehicle to network (V2N) communications. During the vehicle driving, a driver, through such a V2X technology, can be provided with surrounding traffic situations, for example, forward traffic accidents, obstacles, and surrounding vehicle information, in real time, and thus the driver can avoid dangerous situations. Further, through the V2X technology, an electronic device can communicate with the infrastructure and receive, from the infrastructure, signal information related to walking, for example, a signal replacement cycle or next signal information.

SUMMARY

The infrastructure providing traffic information can provide only predetermined signal information (e.g., remaining time) to a driver or a pedestrian in a situation in which the pedestrian is unable to cross the crosswalk within a predetermined signal, but is unable to provide signal information considering the pedestrian to the driver or to the pedestrian.

An electronic device according to various embodiments of the disclosure can receive changed signal information considering a pedestrian from the infrastructure through communication between the pedestrian and the infrastructure using the V2X technology.

According to various embodiments of the disclosure, an electronic device may include: a communication circuit; a display; a processor operatively connected to the communication circuit and the display; and a memory operatively connected to the processor, wherein the memory, when executed, stores instructions for causing the processor to: receive a message for signal information related to walking from an external electronic device through the communication circuit, display, on the display, a first user interface for the received signal information related to walking, receive a message about signal information related to walking, having been changed in accordance with a designated condition, from the external electronic device through the communication circuit while displaying the first user interface, and display, on the display, a second user interface for the changed signal information related to walking.

According to various embodiments of the disclosure, a method for providing a V2X service of an electronic device may include: receiving a message for signal information related to walking from an external electronic device through a communication circuit; displaying, on a display, a first user interface for the received signal information related to walking; receiving a message about signal information related to walking, having been changed in accordance with a designated condition, from the external electronic device through the communication circuit while displaying the first user interface; and displaying, on the display, a second user interface for the changed signal information related to walking.

According to various embodiments of the disclosure, an electronic device may include: a communication circuit; a display; a processor operatively connected to the communication circuit and the display; and a memory operatively connected to the processor, wherein the memory, when executed, stores instructions for causing the processor to: broadcast, at a designated time or in a designated period, a message for information related to the electronic device through the communication circuit, receive a message for signal information related to walking from an external electronic device through the communication circuit, and display, on the display, a first user interface for the received signal information related to walking.

The electronic device according to the various embodiments of the disclosure can receive signal information changed in consideration of pedestrians from infrastructure through the communication between the pedestrian and the infrastructure using V2X technology, and can display a corresponding user interface.

The electronic device according to the various embodiments of the disclosure can change a signal based on pedestrian's information, and thus the pedestrian can safely cross the crosswalk.

According to the various embodiments of the disclosure, the electronic device can receive the changed signal information, and can intuitively provide a user with a signal waiting time increase in accordance with the changed signal information.

BRIEF DESCRIPTION OF THE DRAWINGS

FIG. 12 is a diagram explaining a method for displaying a user interface for changed signal information related to walking according to various embodiments.

DETAILED DESCRIPTION

Figure 1:
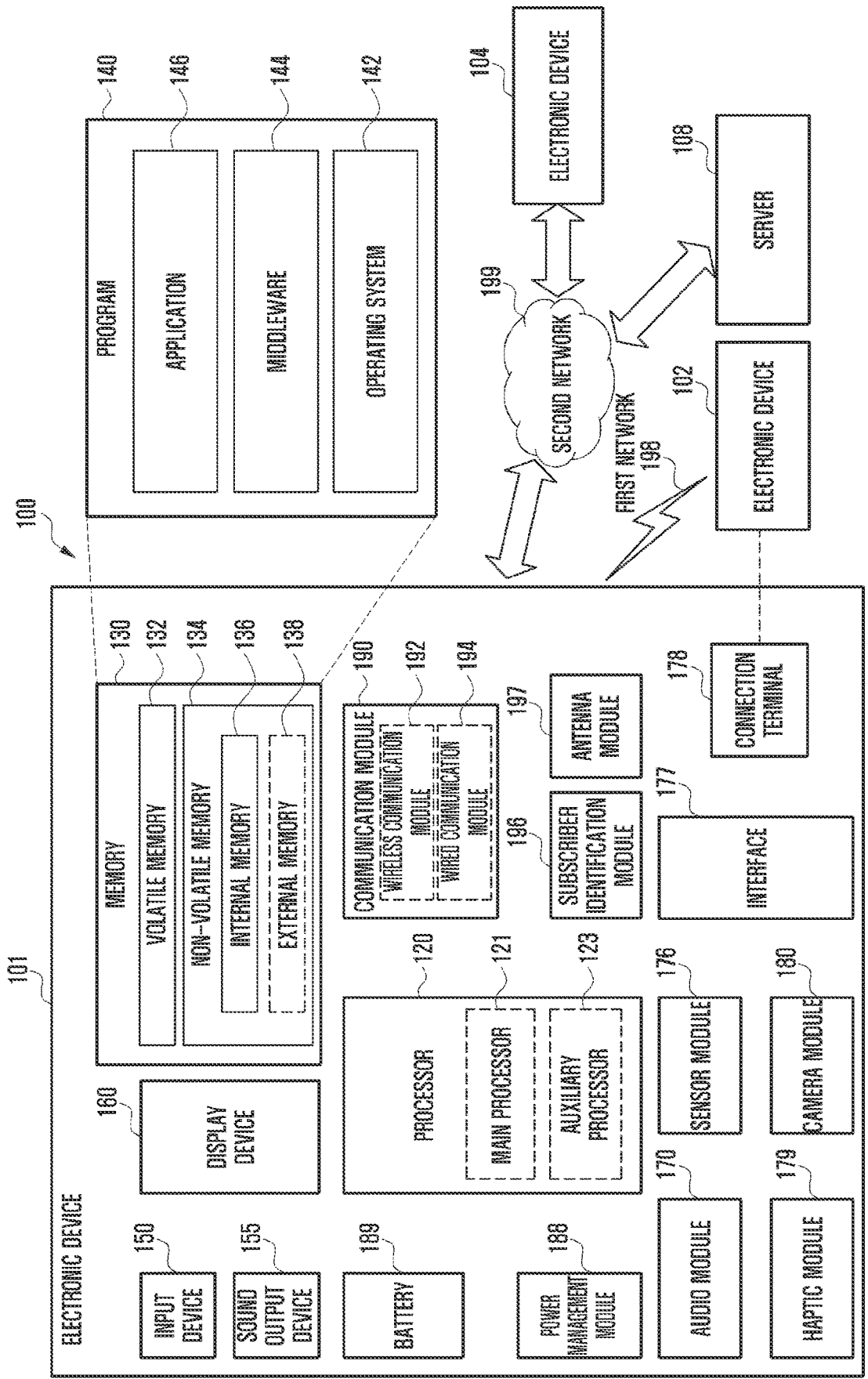
FIG. 1 is a block diagram of an electronic device in a network environment according to various embodiments.

FIG. 1 is a block diagram of an electronic device in a network environment according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may be formed in a conductor or a conductive pattern. According to an embodiment, the antenna module 197 may further include other components (e.g., a radio frequency integrated circuit (RFIC)) in addition to the conductor or the conductive pattern. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
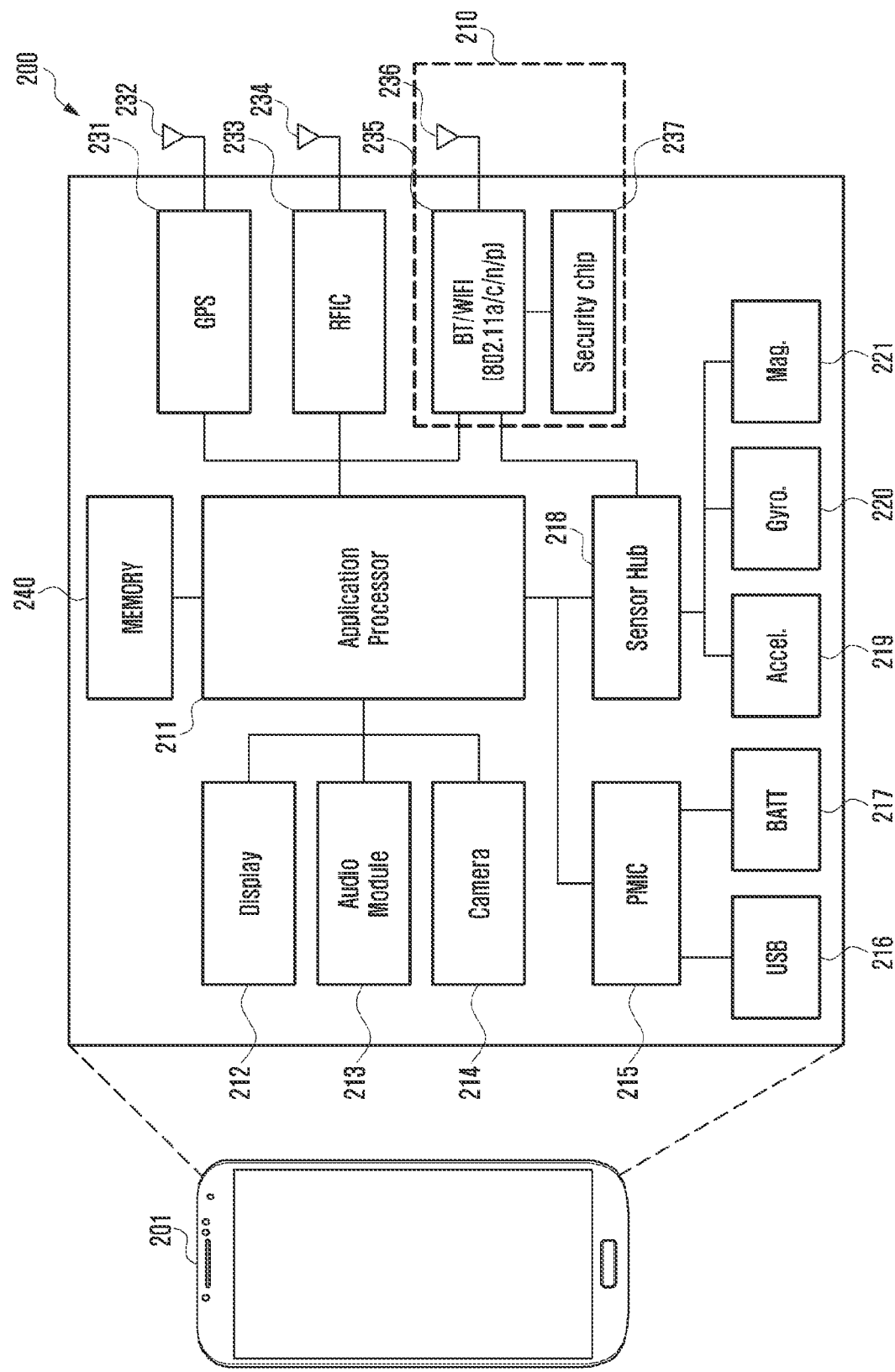
FIGS. 2A, 2B and 2C are diagrams illustrating hardware configurations of an electronic device according to various embodiments.
Figure 2B:
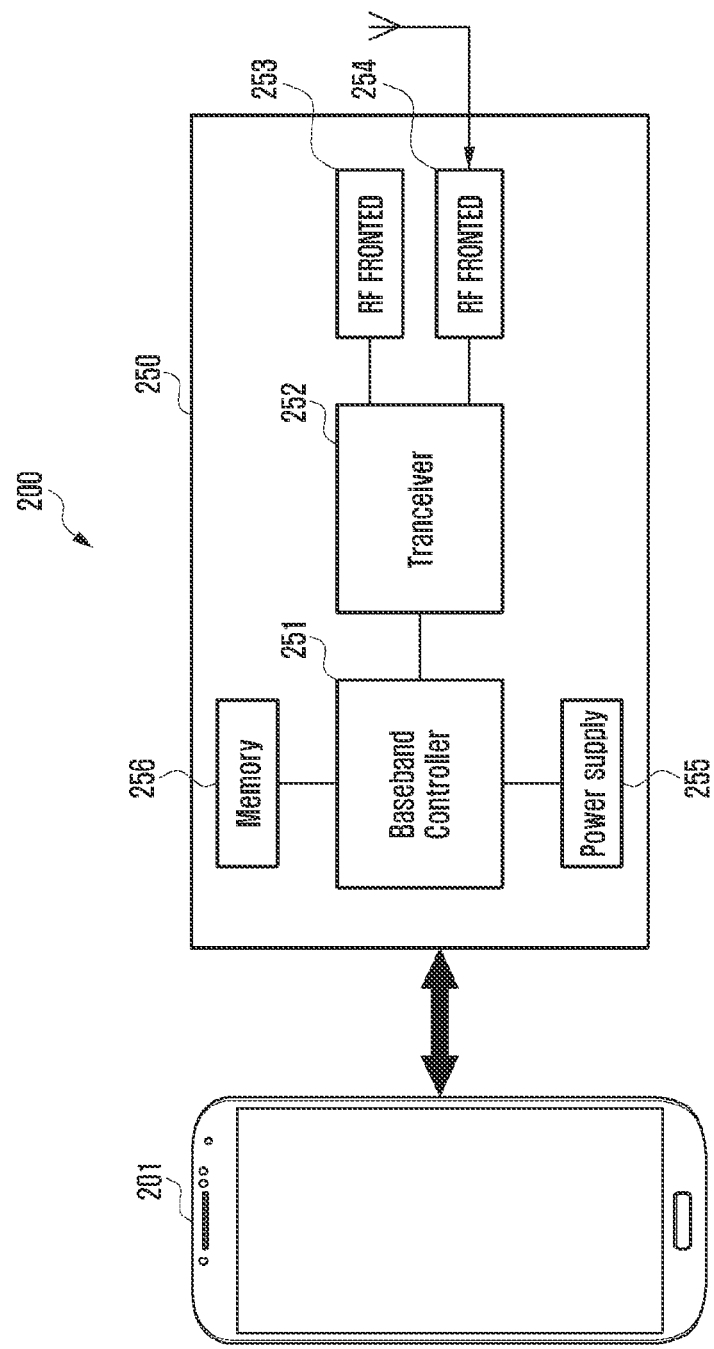
Figure 2C:
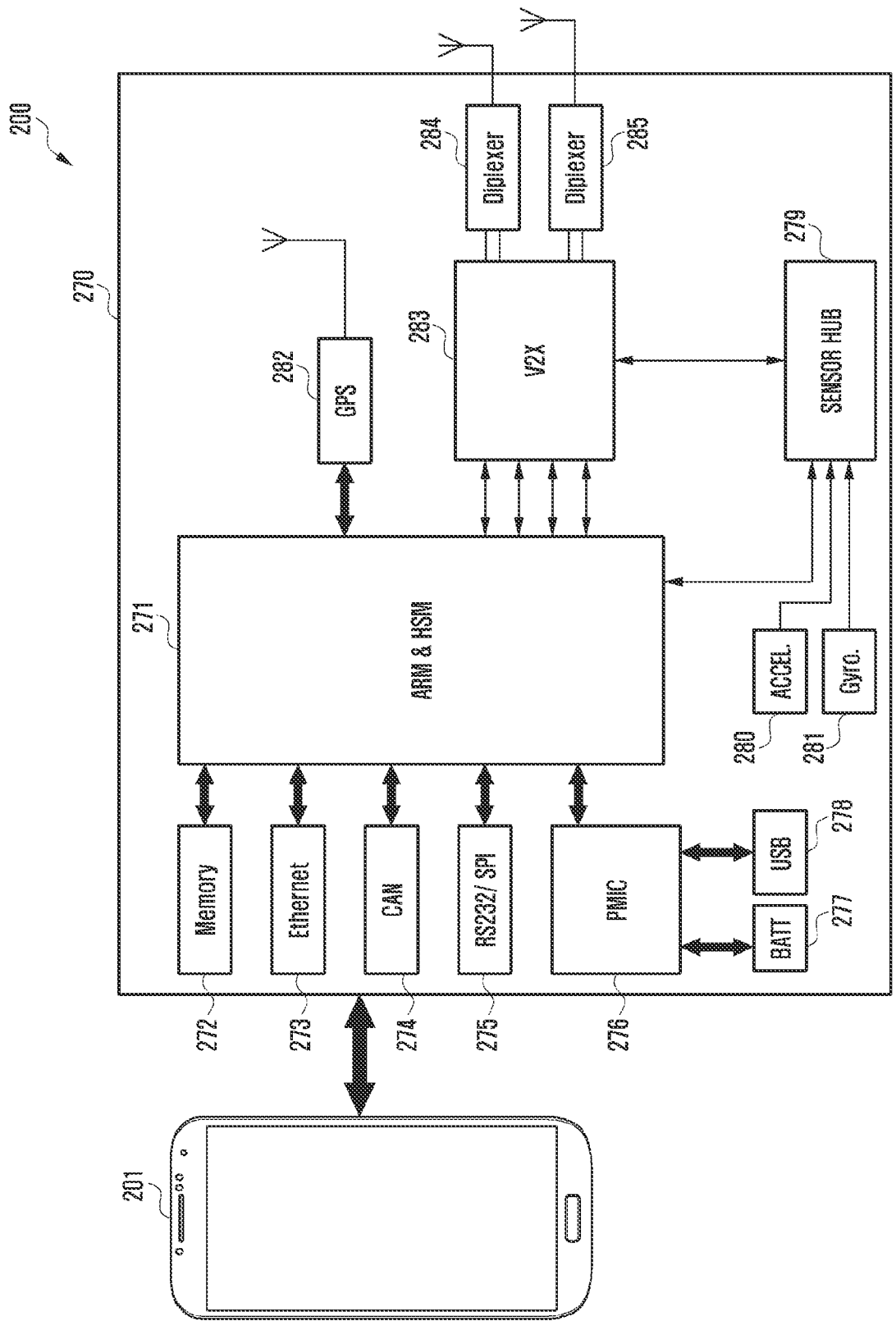

FIGS. 2A to 2C are diagrams 200 illustrating hardware configurations of an electronic device according to various embodiments.

In various embodiments, an electronic device 201 may require a wireless communication system having characteristics of high speed, short range, and low latency especially in a vehicle environment having active mobility. For this, the electronic device 201 may follow wireless access in vehicular environment (WAVE) communication standards, and the WAVE communication standards may include institute of electrical and electronics engineers (IEEE) 802.11p and IEEE 1609 standards.

Referring to FIG. 2A, the electronic device 201 (e.g., electronic device 101 of FIG. 1) may include an application processor (AP) 211, a display 212, an audio module 312, a camera 214, a PMIC 215, a USB interface 216, a battery 217, a sensor hub 218, an acceleration sensor 219, a gyroscope sensor 220, a magnetic sensor 221, a GPS module 231, an antenna for GPS 232, an RFIC 233, an antenna for RFIC 234, a Bluetooth (BT)/Wi-Fi (802.11a/c/n/p) 235, an antenna 236 for BT/Wi-Fi, a security chip 237, and a memory 240.

In an embodiment, the electronic device 201 may include a WAVE module 210 for making the WAVE communication possible. The WAVE module 210 may include the BT/Wi-Fi 235, and the security chip 237.

The AP 211 (e.g., main processor 121 of FIG. 1) may control to perform an overall operation of the electronic device 201. For example, as performing a command stored in the memory 240 (e.g., memory 130 of FIG. 1), the AP 211 may control at least one piece of hardware to perform an operation corresponding to the command. The AP 211 may have one state of a sleep state or a wake-up state. In case of the sleep state, the AP 211 may not perform any specified operation, and thus consumption of the battery 217 by the AP 211 may be reduced. The AP 211 may switch to the wake-up state through triggering of various conditions, or may switch to any one state of various states of the electronic device 201. The various states may be states related to at least one of transmission or reception of at least one of PSM or BSM. In the wake-up state, the AP 211 may operate in accordance with the command stored in the memory 240. The AP 211 may obtain data from various sensors, such as the acceleration sensor 219, gyroscope sensor 220, or magnetic sensor 221, data from the GPS module 231, and various pieces of information, such as the result of image analysis, obtained by the camera 214. The AP 211 may control the BT/Wi-Fi 235 and the antenna 236 for BT/Wi-Fi to transmit a communication signal including the obtained information. Although not illustrated, a front end module (FEM) may be connected between the BT/Wi-Fi 235 and the antenna 236 for the BT/Wi-Fi.

The BT/Wi-Fi 235 may be implemented by a chipset capable of processing data for Wi-Fi and data (e.g., data for WAVE) related to vehicle safety in all. For example, the BT/Wi-Fi 235 may be implemented by a chipset made to process data by IEEE 802.11 a/c/n/p. In addition, the antenna 236 for the BT/Wi-Fi may perform transmission/reception of a communication signal for Wi-Fi and transmission/reception of a communication signal (e.g., communication signal for WAVE) related to the vehicle safety. For example, the communication signal for Wi-Fi may use a frequency band having a center frequency of 5 GHz, and the communication signal for WAVE may use a frequency band having a center frequency of 5.8 GHz, which has a relatively small difference with the frequency band for Wi-Fi, so that the antenna 236 for BT/Wi-Fi may perform the transmission/reception of the two communication signals in all. Although the antenna 236 for BT/Wi-Fi is illustrated as one antenna, this is merely exemplary, and the antenna 236 may be implemented by a plurality of antennas in accordance with requirements in the communication standards. The security chip 237 may store therein information required to process the data for WAVE, and the BT/Wi-Fi 235 may process the data for WAVE using the stored information. For example, the security chip 237 may store therein various pieces of information, such as information used for WAVE modulation/demodulation, information used for encryption/decryption, and information used to process a message. The security chip 237 may be directly or indirectly accessed by the BT/Wi-Fi 235, the AP 211, or the sensor hub 218. In implementation, the security chip 230 may be implemented in a body with the memory 240, or may be implemented by different pieces of hardware. The BT/Wi-Fi 235 may receive data from the AP 211, generate an electric signal corresponding to the communication signal for WAVE by processing the received data, and provide the generated electric signal to the antenna 236 for BT/Wi-Fi. Further, the BT/Wi-Fi 235 may receive data from the sensor hub 218, generate an electric signal corresponding to the communication signal for WAVE by processing the received data, and provide the generated electric signal to the antenna 236 for BT/Wi-Fi. For example, if the AP 211 is in the wake-up state, the BT/Wi-Fi 235 may receive the data from at least one of the AP 211 or the sensor hub 218. If the AP 211 is in the sleep state, the BT/Wi-Fi 235 may receive the data from the sensor hub 218. The sensor hub 218 (e.g., auxiliary processor 123 of FIG. 1) may include at least one of a processing circuit capable of obtaining and processing data from at least one of the sensors (e.g., acceleration sensor 219, gyroscope sensor 220, or magnetic sensor 221) or the GPS module 231, or a storage circuit capable of temporarily or non-temporarily storing the data. The BT/Wi-Fi 235 may include at least one of a processing circuit capable of processing the communication signal for WAVE, a transmission circuit capable of transmitting the communication signal, or a reception circuit capable of receiving the communication signal. The BT/Wi-Fi 235 may perform scanning and analysis to receive the communication signal for each designated period, and even in case that the AP 211 is in the sleep state, it may operate. The BT/Wi-Fi 235 may receive the communication signal, and if the data included in the communication signal satisfies a designated condition, it may wake up the AP 211. If the AP 211 is in the sleep state in a general Wi-Fi operation, if the AP 211 is previously connected even once, or if the communication signal is received from an access point of the designated condition, it may wake up the AP 211. Information for the designated condition or the connected access point may be updated, and if an update is necessary, information of the storage of the BT/Wi-Fi 235 may be changed by the AP 211, and the BT/Wi-Fi 235 may operate by the changed information. The BT/Wi-Fi 235 may include a transmission circuit for transmitting the communication signal, and a reception circuit for processing the communication signal from another electronic device. The electronic device 201 may selectively activate the transmission circuit or the reception circuit. For example, the electronic device 201 may scan the communication signal from another entity even without transmitting the communication signal by inactivating the transmission circuit and activating the reception circuit. In this document, a certain module (e.g., BT/Wi-Fi 235) for performing the communication may be called a communication circuit.

If it is determined that the current location of the electronic device 201 corresponds to a dangerous area, and if it is determined that the electronic device 201 is located out of a transport means, the AP 211 or the sensor hub 218 may activate the transmission circuit of the BT/Wi-Fi 235 corresponding to this, and may control to transmit the communication signal including data obtained through the activated transmission circuit (e.g., communication signal including PSM). The AP 211 or the sensor hub 218 may control to transmit the communication signal using at least a part of geographic information on the designated area. For example, in case of entering the designated area, the electronic device 201 may receive the geographic information of the designated area through a roadside base station (e.g., roadside equipment) or a server, and store the geographic information in the memory 240. In various embodiments of the disclosure, the memory 240 may store therein the information on the dangerous area. The geographic information according to various embodiments of the disclosure may be data expressed by numerical values related to at least one of a designated latitude, longitude, or altitude, or data in the form of an image. If it is determined that the location information of the electronic device 201, which is identified through the GPS module 231, belongs to a designated location (e.g., dangerous area), the AP 211 or the sensor hub 218 may control the BT/Wi-Fi 235 to transmit the communication signal. If the AP 211 is in the sleep state, the sensor hub 218 may receive and store therein only at least a part of the geographic information on the designated area from the memory 240, and compare the stored geographic information with the current location of the electronic device 201 that is identified through the GPS module 231. The sensor hub 218 may determine whether to transmit the communication signal based on the result of the comparison.

The display 212 (e.g., display device 160 of FIG. 1) may display various graphic objects (e.g., graphic user interface (GUI)) related to the vehicle safety. In various embodiments of the disclosure, the display 212 may display a graphic object capable of activating whether to transmit/receive the communication signal for WAVE, and the AP 211 may transmit/receive the communication signal for WAVE in accordance with an input from a user. The audio module 211 (e.g., audio module 170 of FIG. 1) may output vehicle related warning voice. The camera 214 (e.g., camera module 180 of FIG. 1) may photograph an image, and the AP 211 may determine whether to activate transmission/reception of the communication signal for WAVE using the image received from the camera 214. The PMIC 215 (e.g., power management module 188 of FIG. 1) may control and supply at least one of a voltage or current of a power from the battery 217 (e.g., battery 189 of FIG. 1) with numerical values suitable for respective pieces of hardware. A cable for wired power transmission may be connected through the USB interface 216 (e.g., interface 177 of FIG. 1), and the electronic device 201 may receive the power through the USB interface 216 (e.g., interface 177). The RFIC 233 may be implemented by, for example, a chipset for data communication, and generate and provide, to the antenna 234 for RFIC, an electric signal corresponding to the signal for the data communication based on the data from the AP 211. The acceleration sensor 219 may identify an acceleration of the electronic device 201, and the gyroscope sensor 220 may identify rotation information. The magnetic sensor 221 may identify magnetic information. The AP 211 or the sensor hub 218 may include information in the communication signal (e.g., communication signal including PSM) to be transmitted through the BT/Wi-Fi 235 using data from the various kinds of sensors (e.g., acceleration sensor 219, gyroscope sensor 220, or magnetic sensor 221) or the GPS module 231.

In various embodiments of the disclosure, the electronic device 201 may not include the sensor hub 218. In this case, the AP 211 may be always in the wake-up state, or may periodically wake up to determine whether to transmit the communication signal.

In various embodiments of the disclosure, the AP 211 or the sensor hub 218 may execute a vulnerable road user (VRU) safety application. The VRU safety application may be an application capable of generating the above-described BSM or PSM. The VRU safety application may determine the location, direction, speed, or time of the electronic device 201, or relative locations to other entities based on at least a part of data from the GPS module 231, data obtained from a BLE positioning system, or data collected from various sensors (e.g., acceleration sensor 219, gyroscope sensor 220, or magnetic sensor 221). The VRU safety application may generate the PSM in accordance with an event being detected, or may determine a time point to transmit the corresponding PSM.

In various embodiments of the disclosure, the AP 211 or the sensor hub 218 may select any one of various states of the electronic device 201, and may determine a transmission or reception mode of the PSM or BSM corresponding to the selected state. The AP 211 or the sensor hub 218 may control the transmission/reception mode of the BT/Wi-Fi 235 in accordance with the determined transmission/reception mode.

Referring to FIG. 2B, the electronic device 201 may perform WAVE communication through communication with an external electronic device 250 supporting a WAVE module. The external electronic device 250 may be a WAVE module in a dongle form. The external electronic device 250 may include a baseband controller 251, a transceiver 252, and/or RF fronted 253 and 254 connected to the transceiver 252.

In an embodiment, the baseband controller 251 may serve to control a frequency band obtained by all signals being used to modulate a designated carrier.

In an embodiment, the transceiver 252 and the RF fronted 253 and 254 connected to the transceiver 252 may perform communication in accordance with the WAVE communication standard under the control of the baseband controller 251.

The external electronic device 250 is not limited thereto, but may include, for example, a USB connector (not illustrated) connecting the electronic device 201 and the external electronic device 250 with each other, a power supply 255 supplying a power to the external electronic device 250, and/or a memory 256 including a serial peripheral interface (SPI) flash memory.

Referring to FIG. 2C, the electronic device 201 may perform the WAVE communication through the communication with the external electronic device 270 supporting the WAVE module.

In an embodiment, the external electronic device 270 may include an ARM/hardware security modules (HSM) 271, a memory 272, an Ethernet 273, a controller area network (CAN) 274, a recommended standard 232 (RS232)/serial to parallel interface (SPI) 275, a PMIC 276, a battery 277, a USB 278, a sensor hub 279, an acceleration sensor 280, a gyroscope sensor 281, a GPS module 282, a V2X module 283, and diplexers 284 and 285 connected to the V2X module 283.

Since the PMIC 276, the battery 277, the USB 278, the sensor hub 279, the acceleration sensor 280, the gyroscope sensor 281, and the GPS module 282 of FIG. 2C are the same as the PMIC 215, the battery 217, the USB interface 216, the sensor hub 218, the acceleration sensor 219, the gyroscope sensor 220, and the GPS module 231 of FIG. 2A, respectively, the explanation thereof will be replaced by the explanation related to FIG. 2A.

In an embodiment, the V2X module 283 and diplexers 284 and 285 connected to the V2X module 283 may perform communication in accordance with the WAVE communication standards under the control of the ARM/HSM 271 corresponding to a central processing unit.

In an embodiment, the electronic device 201 may perform communication with the external electronic device 270 using at least one method of Ethernet 273, controller area network (CAN) 274, or recommended standard 232 (RS232)/serial to parallel interface (SPI) 275.

In an embodiment, as the memory 272, an embedded multi-chip package (eMCP) including a dynamic random-access memory (DRAM) may be applied.

Figure 3:
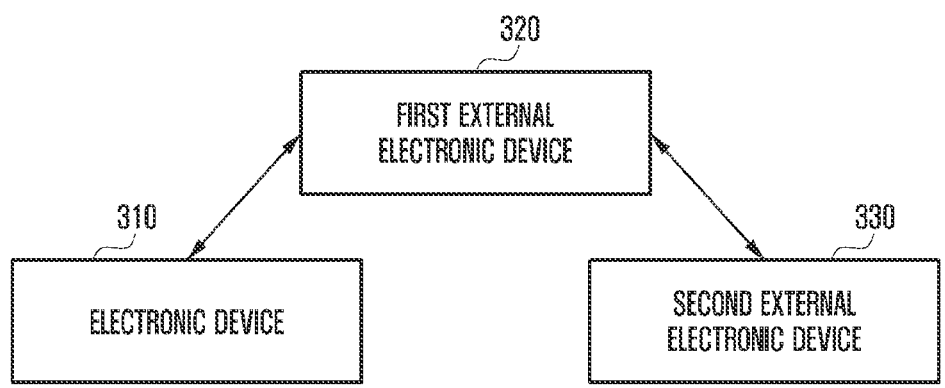
FIG. 3 is a block diagram of an electronic device according to various embodiments, showing signal flow among electronic devices.

FIG. 3 is a block diagram of an electronic device according to various embodiments, showing signal flow among electronic devices.

Referring to FIG. 3, explanation will be made under the assumption that an electronic device 310, a first external electronic device 320, and a second external electronic device 330 are a pedestrian electronic device provided with a V2X module that enables communication in accordance with the WAVE communication standards, a traffic light infrastructure, and a driver electronic device (e.g., multimedia device (e.g., navigation) built in a vehicle), respectively.

In an embodiment, the electronic device 310 and the second external electronic device 330 may be implemented in at least one form in FIGS. 2A to 2C as described above.

In an embodiment, the electronic device 310 may broadcast information related to the electronic device 310 at a designated time or in a designated period. The second external electronic device 330 may broadcast situation information related to the second external electronic device 330 at a designated time or in a designated period. The first external electronic device 320 may broadcast signal information related to walking at a designated time or in a designated period. In an embodiment, the electronic device 310 and the first external electronic device 320 or the first external electronic device 320 and the second external electronic device 330 may transmit and receive the information through a communication circuit, for example, V2X module.

In an embodiment, each of the electronic device 310 and the second external electronic device 330 may display a user interface for the signal information related to the walking, which is received from the first external electronic device 320. For example, the user interface may include a current signal state and/or a remaining time of the signal.

In an embodiment, the first external electronic device 320 may determine whether to change (e.g., extend) the signal related to the walking based on the information related to the electronic device 310, which is received from the electronic device 310. For example, the first external electronic device 320 may determine whether the situation requires the signal control. The situation in which the signal control is necessary may include a case where a pedestrian, such as a pregnant woman, children, an elderly person, and/or a disabled, is unable to cross the crosswalk within a designated time. If it is determined that the change of the signal related to the walking is necessary based on the information related to the electronic device 310, for example, location information and/or movement speed of the electronic device 310, the first external electronic device 320 may change the signal related to the walking, and may broadcast the changed signal information related to the walking.

In an embodiment, the electronic device 310 may display the user interface for the changed signal information related to the walking, which is being broadcasted from the first external electronic device 320. The user interface for the changed signal information related to the walking may include at least one of the changed signal information and/or a message for the reason why the signal has been changed.

According to various embodiments, the operations of the electronic device 310 as described above, the first external electronic device 320, and the second external electronic device 330 will be described in detail with reference to FIGS. 4 to 9, FIG. 13, and FIGS. 10 to 12, respectively.

Figure 4:
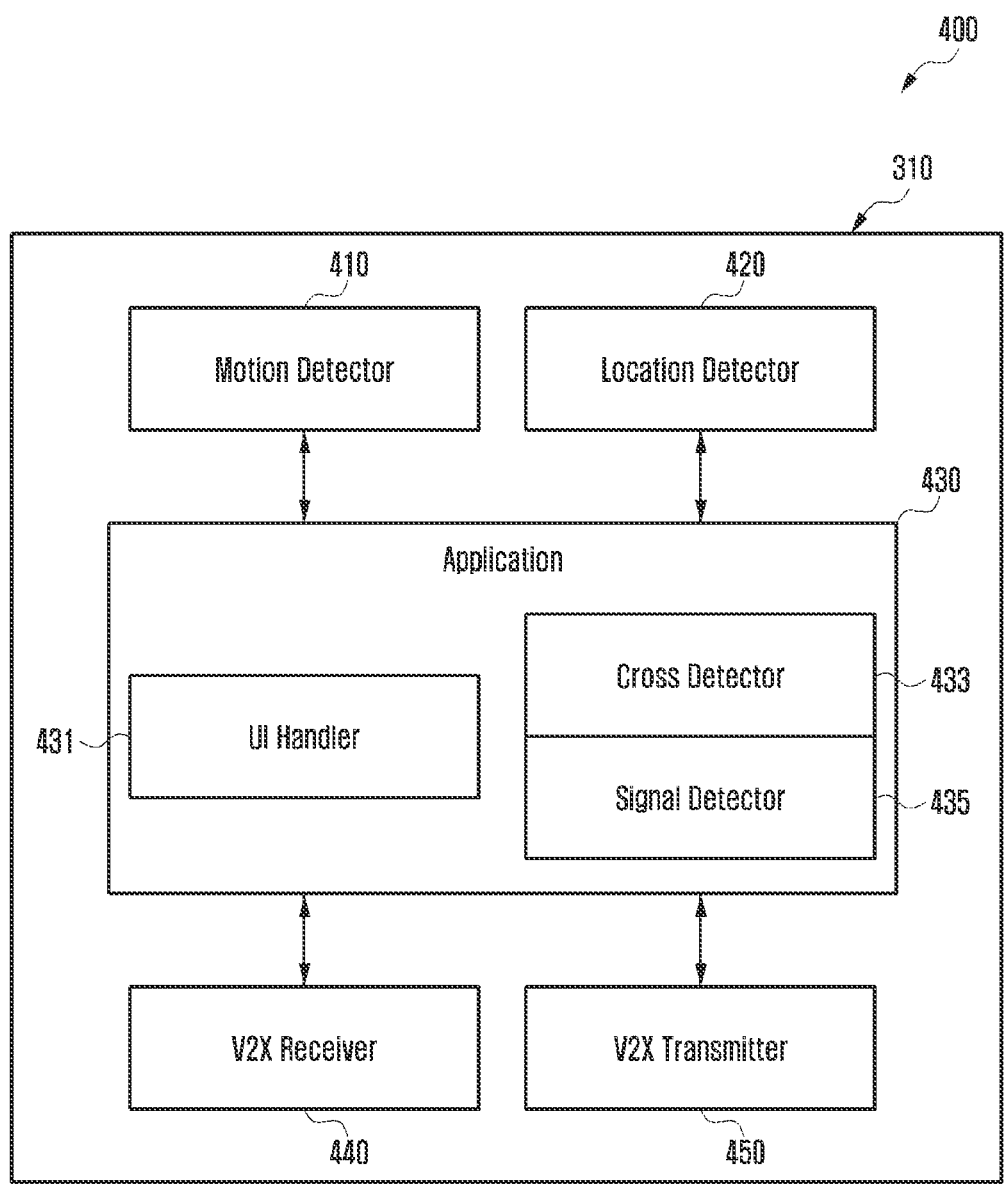
FIG. 4 is a block diagram illustrating an electronic device according to various embodiments.

FIG. 4 is a block diagram 400 illustrating an electronic device according to various embodiments.

Referring to FIG. 4, the electronic device 310 may include a motion detector 410, a location detector 420, an application 430, a V2X receiver 440, and a V2X transmitter 450.

In an embodiment, the motion detector 410 may detect a current walking direction and/or walking state of a user of the electronic device 310 using a sensor unit (e.g., sensor hub 218 of FIG. 2A), for example, an acceleration sensor (e.g., acceleration sensor 219 of FIG. 2A) and a magnetic sensor (e.g., magnetic sensor 221 of FIG. 2A).

In an embodiment, the location detector 420 may obtain location information of the electronic device 310. The location detector 420 may obtain the current location information of the electronic device 310 using a location sensor, for example, a global positioning system (GPS) (e.g., GPS module 231 of FIG. 2A), or a network, for example, Wi-Fi or cell (cellular).

In an embodiment, the application 430 may include a UE handler 431, a cross detector 433, or a signal detector 435.

In an embodiment, the UI handler 431 may analyze steps of a user of the electronic device 310 through the motion detector 410 and the location detector 420, and may display, on a display (e.g., display 212 of FIG. 2A), a user interface related to a request for signal information related to walking, a user interface for the received signal information in case of receiving the signal information, and a user interface for the changed signal information in case of receiving the changed signal information. In an embodiment, the cross detector 433 may detect whether the user is currently waiting for the signal or is crossing by using map information including crosswalk information obtained through a communication circuit, for example, through at least one of Bluetooth (BT), Wi-Fi, or V2X module, or analyzing the steps and location of the user of the electronic device 310 through the motion detector 410 and the location detector 420.

In an embodiment, the signal detector 435 may manage current signal information, next signal information, and/or location information of the external electronic device (e.g., first external electronic device 320 of FIG. 3, for example, infrastructure) by analyzing a received V2X message.

In an embodiment, the V2X receiver 440 and the V2X transmitter 450 may transmit and receive V2X messages, and support at least one communication technology among various communication technologies, such as WAVE or cellular-V2X (C-V2X), LTE device-to-device (LTE D2D), network, or 5G supporting mmWave band, and communicate with the external electronic device.

In an embodiment, the electronic device 310 may include: a communication circuit (e.g., WAVE module 210); a display (e.g., display 212 of FIG. 2A); a processor (e.g., AP 211 of FIG. 2A) operatively connected to the communication circuit and the display; and a memory (e.g., memory 240 of FIG. 2A) operatively connected to the processor, wherein the memory, when executed, stores instructions for causing the processor to: broadcast, at a designated time or in a designated period, a message for information related to the electronic device 310 through the communication circuit, receive a message for signal information related to walking from a first external electronic device (e.g., first external electronic device 320) through the communication circuit, and display, on the display, a first user interface based on the received signal information related to walking.

In an embodiment, the instructions may cause the processor to: provide a second user interface for configuring whether to receive the signal information related to the walking from the first external electronic device (e.g., first external electronic device 320), and display the first user interface on the display based on the configuration of the second user interface.

In an embodiment, the instructions may cause the processor to: display a third user interface for selecting one external electronic device in case that the signal information related to the walking is received from a plurality of external electronic devices, detect selection of the one external electronic device through the third user interface, and transmit, at the designated time or for the designated period, the message for the information related to the electronic device to the one external electronic device based on the detected selection through the communication circuit.

In an embodiment, the instructions may cause the processor to receive the message for the signal information related to the walking from the one external electronic device through the communication circuit.

In an embodiment, the instructions may cause the processor to: determine whether the electronic device 310 is located within a designated range from the first external electronic device (e.g., first external electronic device 320) in case of receiving the message for the signal information related to the walking, and display the first user interface on the display based on at least a part of the result of the determination.

In an embodiment, the message for the signal information related to the walking may include at least one of location information of the first external electronic device (e.g., first external electronic device 320), a current signal state, or a remaining time of the current signal, and the message for the information related to the electronic device 310 includes at least one of user type information of the electronic device 310, current location information, direction information, information on whether to cross a road, or information on whether to receive the signal information related to the walking.

Figure 5:
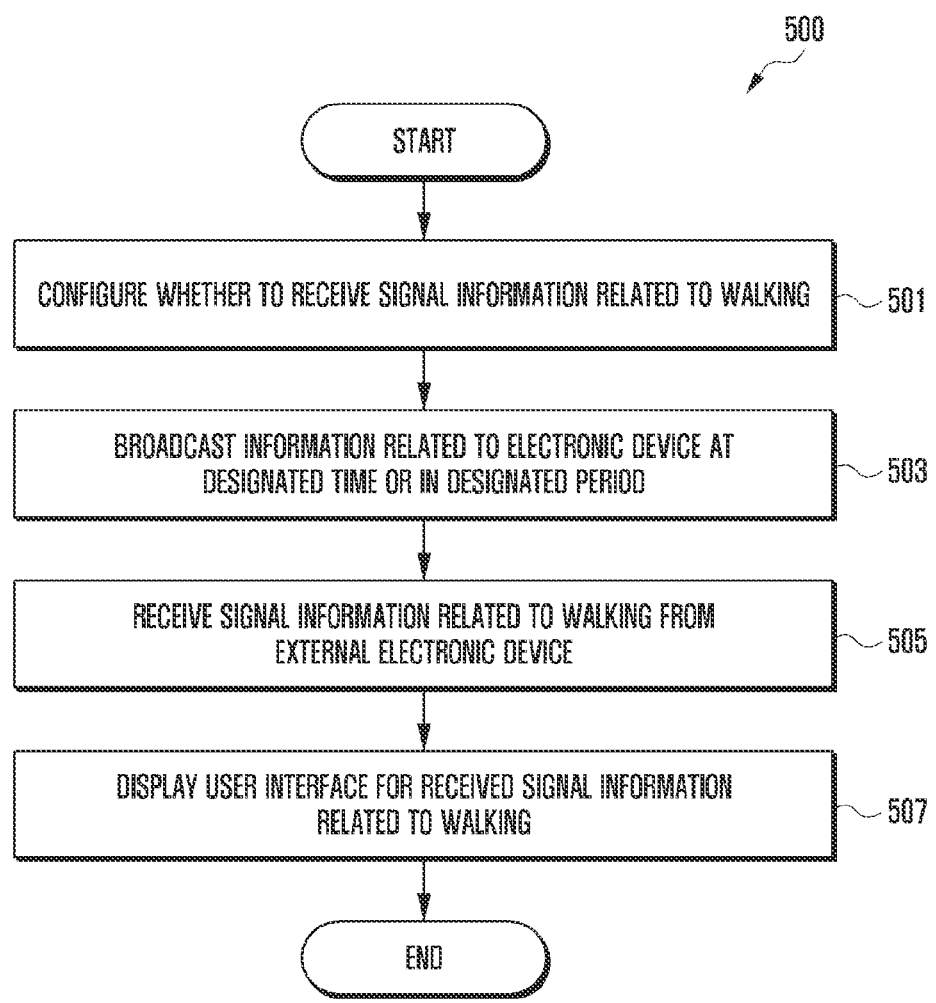
FIG. 5 is a flowchart explaining a method for providing a V2X service of an electronic device according to various embodiments.

FIG. 5 is a flowchart 500 explaining a method for providing a V2X service of an electronic device according to various embodiments.

According to various embodiments, explanation will be mode under the assumption that an electronic device of FIG. 5 (e.g., electronic device 310 of FIG. 3) is an electronic device provided with a V2X module (e.g., V2X receiver 440 and a V2X transmitter 450) enabling communication in accordance with the WAVE communication standards, for example, a pedestrian electronic device.

Referring to FIG. 5, the electronic device 310, at operation 501, may configure whether to receive signal information related to walking. The electronic device 310 may configure whether to receive the signal information related to the walking from an external electronic device (e.g., first external electronic device 320 of FIG. 3) provided with the V2X module, for example, a road side unit (RSU) (e.g., traffic light infrastructure). If it is configured to receive the signal information related to the walking, the electronic device 310, through operation 503 to be described later, may receive the signal information related to the walking from the external electronic device 320.

However, the operation is not limited thereto, and the operation 501 may be omitted. For example, the electronic device 310 may display a user interface (e.g., popup window) capable of configuring whether to receive the signal information related to the walking from the external electronic device 320. The user of the electronic device 310 may configure, through the user interface, whether to receive the signal information related to the walking from the external electronic device 320 at the current location.

In an embodiment, in case that it is configured to receive the signal information related to the walking, the electronic device 310 may perform operations 503 to 507 to be described later. In case that it is not configured to receive the signal information related to the walking, the electronic device 310 may not perform the operations 503 to 507 to be described later.

In an embodiment, the electronic device 310, at operation 503, may broadcast information related to the electronic device 310 at a designated time or in a designated period. For example, the electronic device 310 may broadcast a message (e.g., personal safety message (PSM)) including the information related to the electronic device 310 as shown in Table 1 to Table 3 below based on the WAVE communication technology standards (e.g., J2735) through a communication circuit, for example, V2X transmitter (e.g., V2X transmitter 450 of FIG. 4).

In an embodiment, the information related to the electronic device 310 may include type information of a user of the electronic device 310, for example, a pedestrian (e.g., a pedal cyclist, a public safety worker, an elderly person, a pregnant woman, children, or a disabled), current location information, direction information, information on whether a pedestrian crosses a road, and/or information on whether to receive a signal related to pedestrian's walking.

The information is not limited thereto, and as shown in Table 1 to Table 3 below, additional information (e.g., a public safety worker's type and/or a disability type) in accordance with the pedestrian's type may be transmitted to the external electronic device.

TABLE 1

| Personal Safety Message (PSM) | Description | Remarks |
| --- | --- | --- |
| basicType | Designation of use purpose of user equipment | Pedestrian Pedal_Cyclist Public Safety Worker Animal |
| secMark | Time (second) | |
| msgCnt | Message sequence number | |
| id | Temporary ID | Random |
| position (Latitude, Longitude, Elevation) | Latitude, Longitude, Altitude | |

TABLE 1-continued

| Personal Safety Message (PSM) | Description | Remarks |
|---|---|---|
| Accuracy | Accuracy | |
| speed | Speed | |
| heading | Direction | |
| | optional data element | |
| accelSet | Acceleration by wheels | |
| pathHistory | Path history | |
| pathPrediction | Path prediction | |
| propulsion | Propulsion power source | Human |
| | | Animal |
| | | Motocycle |
| useState | Device use state | smartphone screen OFF (idle) state |
| | | listeningToAudio |
| | | typing |
| | | calling |
| | | playingGames |
| | | reading |
| | | moving image viewing |

TABLE 2

| Personal Safety Message (PSM) | Description | Remarks |
|---|---|---|
| crossRequest | Road cross request | Intention of vulnerable road users (VRU) to cross road |
| crossState | Road cross proceeding state | |
| clusterSize | Size of road cross group | |
| clusterRadius | Radius of road cross group | |
| eventResponderType | Designation of public safety worker | towOperater |
| | | fireAndEMSWorker |
| | | aDOTWorker |
| | | lawEnforcement |
| | | hazmatResponder |
| | | animalControlWorker |
| activityType | Designation of work situation of public safety worker | Whether to work on road (Construction, Geological survey, Garbage collection, Place investigation) |
| | | Work settings (During traffic light installation, construction cone installation, and flare installation) |
| | | Work situation (During treatment of the injured, dangerous goods removal, and criminal investigation) |
| | | Traffic control (signal control and lane control) |
| activitySubType | Designation of work details of public safety worker | Traffic control police officer |
| | | Traffic control worker |
| | | Train safety management worker |
| | | Safety management national defense force |
| | | Emergency relief worker (firefighter or ambulance) |
| | | Highway towing and service worker |

TABLE 3

| Personal Safety Message (PSM) | Description | Remarks |
| --- | --- | --- |
| assistType | Designation of disability type of disabled | Visual impairment, Hearing impairment, Gait disorder, and Cognitive impairment |
| sizing | Pedestrian's height and behavior type | Short height, Tall height Erratic movement, Ultra slow moving |
| attachment | Objects owned by VRU | Stroller, Bicycle, Cart, Wheelchair, Walking aids, Puppy |
| attachmentRadius | Size of objects owned by VRU | |
| animalType | Animal type | Visual impairment guide dog, Police dog, Pet dog, Livestock |

In an embodiment, the electronic device 310, at operation 505, may receive the signal information related to the walking from the external electronic device 320. For example, the signal information related to the walking may include location information of the corresponding infrastructure, for example, traffic light infrastructure (e.g., crossroad area name and/or crossroad entry direction), a signal controller state, a signal kind, a current signal state, and/or a remaining time of the signal.

In an embodiment, at a designated time, in a designated period, and/or in case of requesting signal information related to walking from the external electronic device 320, the electronic device 310 may receive the signal information related to the walking from the external electronic device 320.

The operation of the external electronic device 320 is not limited thereto, but the external electronic device 320 may broadcast the signal related to the walking with designated signal strength. The electronic device 310 may filter the signal related to the walking, which is broadcasted from the external electronic device, and display the signal information related to the walking based on this. For example, the electronic device 310 may filter the signal corresponding to the signal strength and/or distance configured (e.g., limited) by the electronic device 310 (e.g., distance in which the configured signal information related to the walking is to be received based on the status information (e.g., movement direction and/or movement speed) of the electronic device 310).

According to an embodiment, since the electronic device 310 filters only the signal (e.g., signal information related to the walking) corresponding to the configured signal strength and/or distance to provide the filtered signal to the user, it is possible to prevent power consumption.

In an embodiment, the electronic device 310, at operation 507, may display the user interface for the received signal information related to the walking. The signal information related to the walking may include the current signal state and/or the remaining time of the signal.

In an embodiment, although not illustrated, if the changed signal information related to the walking is received from the external electronic device 320, the electronic device 310 may display the user interface for the changed signal information related to the walking. In an embodiment, the changed signal information related to the walking may include extended signal information. For example, if information on signal extension determined based on the information related to the electronic device 310 is received from the external electronic device 320, the electronic device 310 may display the user interface indicating the remaining signal information based on the extended signal information.

In another embodiment, the electronic device 310 may display the user interface to guide not to enter the crosswalk. For example, if the external electronic device 320 determines that the pedestrian is unable to cross the crosswalk for the remaining time of the walking signal based on the speed of the electronic device 310, for example, the walking speed of the pedestrian, the electronic device 310 may display the user interface including information to guide not to enter the crosswalk based on the signal information received from the external electronic device 320.

Figure 6:
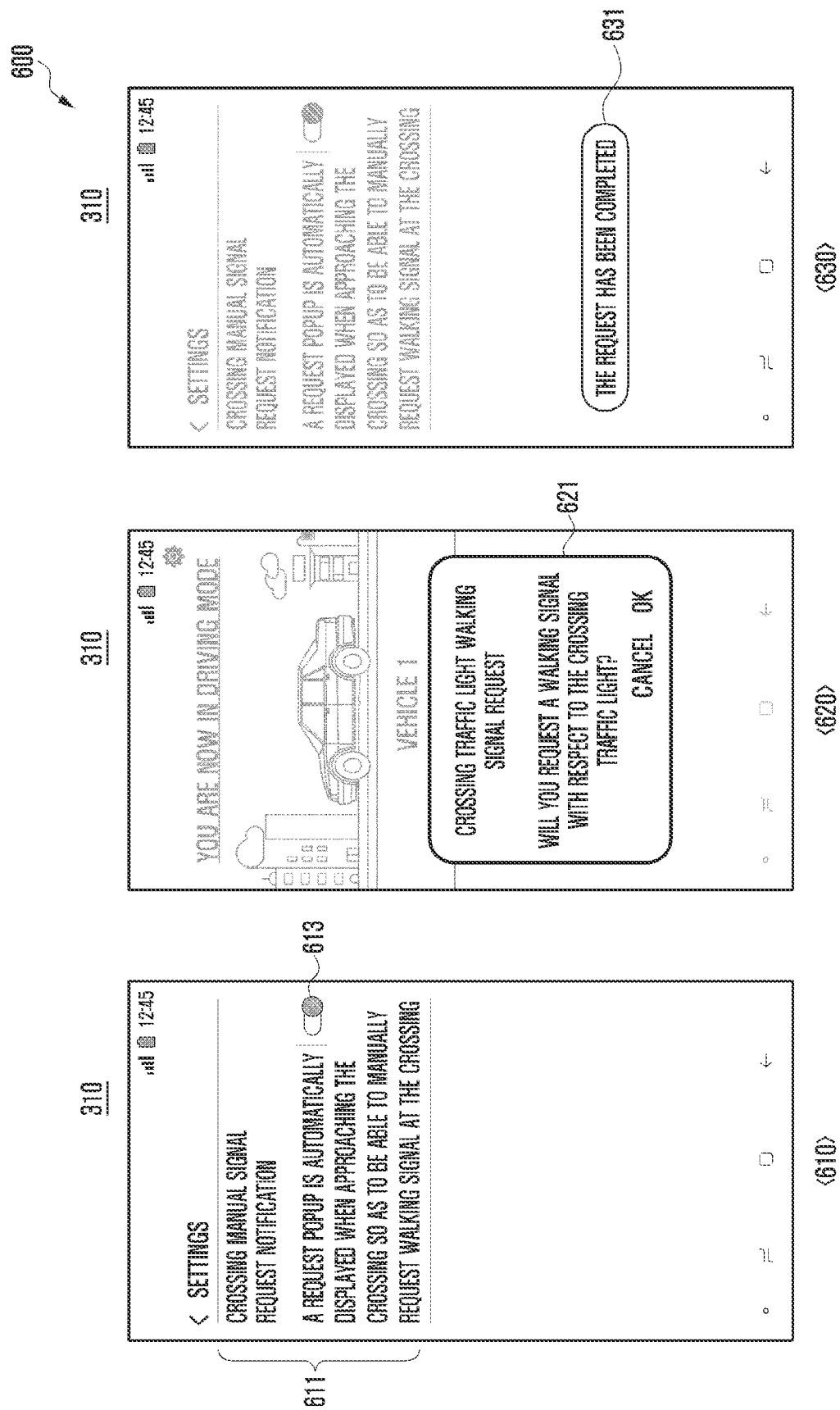
FIG. 6 is a diagram explaining a method for configuring whether to receive signal information related to walking according to various embodiments.

FIG. 6 is a diagram 600 explaining a method for configuring whether to receive signal information related to walking according to various embodiments.

Referring to FIG. 6, the electronic device 310, as denoted by reference number 610, may display a user interface for configuring whether to receive signal information related to walking from the external electronic device (e.g., first external electronic device 320 of FIG. 3) (e.g., traffic light infrastructure). For example, the user interface may include an item 613 capable of configuring whether to receive a message for the signal information related to the walking, for example, "Crossing manual signal request notification" 611. For example, the item 613 may have a toggle function, and when the item 613 is selected, it is controlled to be turned on/off, and it becomes possible to configure reception/non-reception of the signal information related to the walking from the external electronic device.

In an embodiment, in case that the item 613 is configured to be turned on, the electronic device 310 may obtain location information and motion information of the electronic device 310. For example, the electronic device 310 may determine whether the motion of the electronic device 310 at a designated speed (e.g., speed equal to or more than 0 km/h) in a direction of the crosswalk related to the external electronic device 320, for example, traffic light infrastructure, is detected through the motion detector (e.g., motion detector 410 of FIG. 4). If the motion is not detected for the designated time (e.g., 5 seconds or more), the electronic device 310 may determine a signal waiting state.

In an embodiment, if it is determined that the electronic device 310 is in the signal waiting state, the electronic device 310 may automatically transmit a message for requesting the signal information related to the walking from the external electronic device 320.

However, the operation of the electronic device 310 is not limited thereto, and as denoted by reference number 620, the electronic device 310 may display a notification message 621 for whether to request the signal information related to the walking. For example, the electronic device 310 may analyze a signal phase and timing message (SPaT) which is a message being received from the external electronic device 320 in a range in which the signal information related to the walking, for example, traffic light infrastructure information, can be received. If the traffic light infrastructure exists within the range in which the infrastructure information, for example, traffic light infrastructure information, can be received at the current location, and the corresponding traffic light infrastructure signal is not the walking signal as the result of analyzing the SPaT which is the message received from the external electronic device 320, the electronic device 310 may collect information through the location detector (e.g., location detector 420 of FIG. 4). If it is determined that the user of the electronic device 310 is in the signal waiting state through the cross detector (e.g., cross detector 433 of FIG. 4) based on the collected information, the electronic device 310 may output the notification message 621, and identify whether the user has requested the signal information related to the walking.

In an embodiment, if selection of an ok button (e.g., OK) is detected from the notification message 621, the electronic device 310, as denoted by reference number 630, may display a message indicating that the message for requesting the signal information related to the walking has been transmitted to the external electronic device 320, for example, "The request has been completed" 631. In accordance with the display of the message 631, the user may intuitively identify that the request for the signal information related to the walking has been transmitted to the external electronic device 320, for example, the traffic light infrastructure. If selection of a cancel button (e.g., CANCEL) is detected from the notification message 621, the electronic device 310 may not transmit the message for requesting the signal information related to the walking to the external electronic device 320.

In an embodiment, the notification message 621 denoted by reference number 620 may be displayed in case that one external electronic device 320, for example, a single traffic light infrastructure, exists within the range in which the traffic light infrastructure information can be received. However, the display of the notification message 621 is not limited thereto, but in case that a plurality of traffic light infrastructures exist within the range in which the traffic light infrastructure information can be received, the electronic device 310 may detect the selection of the traffic light infrastructure to receive the signal information related to the walking among the plurality of traffic light infrastructures, and receive the signal information for the traffic light infrastructure selected among the plurality of traffic light infrastructures. This will be described in detail with reference to FIG. 7.

Figure 7:
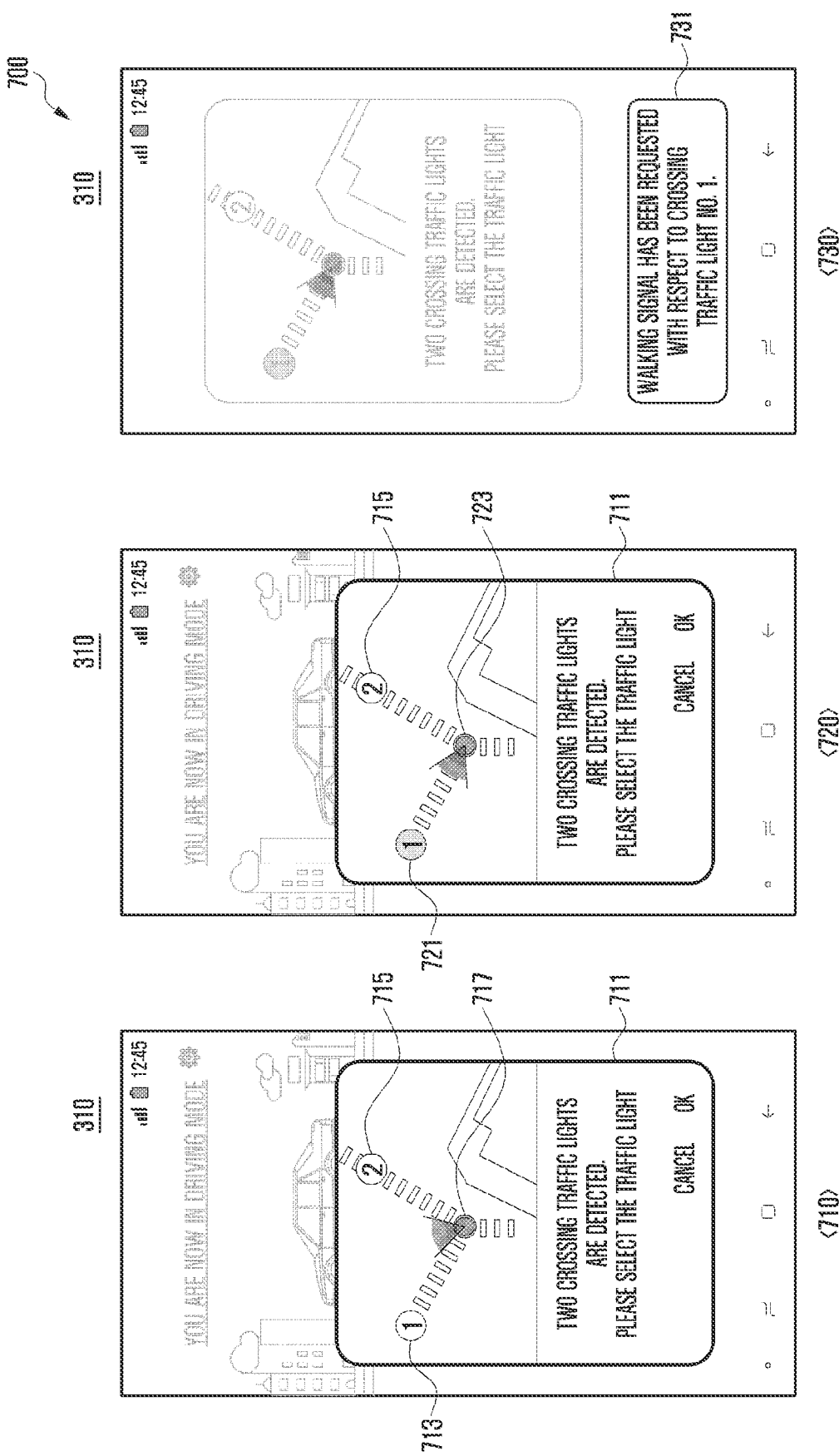
FIG. 7 is a diagram explaining a method for configuring whether to receive signal information related to walking from one selected among a plurality of external electronic devices according to various embodiments.

FIG. 7 is a diagram 700 explaining a method for configuring whether to receive signal information related to walking from one selected among a plurality of external electronic devices according to various embodiments.

Referring to FIG. 7, if a plurality of external electronic devices (e.g., first external electronic devices 320 of FIG. 3), for example, a plurality of traffic light infrastructures, are detected within a designated distance at the current location of the electronic device 310, the electronic device 310 may detect selection of one traffic light infrastructure to receive the signal information related to the walking among the plurality of traffic light infrastructures.

For example, if movement of the electronic device 310 in a direction of the crosswalk related to the plurality of traffic light infrastructures is not detected, and the electronic device 310 is located within the range in which the traffic light infrastructure information can be received for a designated time (e.g., 5 seconds or more), the electronic device 310 may determine that the user is in the signal waiting state. If the signal waiting state is determined, the electronic device 310, as denoted by reference number 710, may display a user interface 711 capable of selecting the traffic light infrastructure to request the signal information related to the walking among the plurality of traffic light infrastructures. The user interface 711 may include a map on which an indicator 717 indicating the current location of the electronic device 310 and a plurality of traffic light infrastructures, for example, a first traffic light infrastructure 713 and a second traffic light infrastructure 715, located within the designated distance at the current location are indicated. The map may be obtained through a communication circuit, for example, at least one of Bluetooth (BT), Wi-Fi, V2X module, or 5G. The first traffic light infrastructure 713 and the second traffic light infrastructure 715 may be distinctively displayed so that the user can easily select them. For example, the first traffic light infrastructure 713 and the second traffic light infrastructure 715 may be displayed with different figures, or may be displayed with indicative words indicating different directions, such as left and right, based on the user's movement direction.

In an embodiment, the electronic device 310 may detect an input for selecting one of the first traffic light infrastructure 713 and the second traffic light infrastructure 715 on the user interface 711. For example, the electronic device 310 may detect a touch input for selecting one traffic light infrastructure on the user interface 711. The detection of the input is not limited thereto, and the electronic device 310 may receive a voice signal for selecting one of the plurality of traffic light infrastructures from a microphone (not illustrated). For example, the electronic device 310 may audibly output a message (e.g., "You are at the intersection. In case of waiting for the straight direction traffic light, please say "No. 1", in case of waiting for the right turn traffic light, please say "No. 2", and in case of not crossing, please say "Cancel") so as to select one of the plurality of traffic light infrastructures through a speaker (not illustrated). After audibly outputting the message, the electronic device 310 may perceive the figure being uttered by the user through the microphone (not illustrated), and control to select the traffic light infrastructure corresponding to the perceived figure. Through the audible output of the message and the utterance of the figure of the corresponding traffic light, the user can easily select the traffic light infrastructure in a situation where the user, who may be a visually impaired or a user using a bicycle, uses a hands-free.

In an embodiment, as a method for selecting a traffic light infrastructure, the electronic device 310 may detect the selection of the traffic light infrastructure using a head direction of the electronic device 310. For example, the electronic device 310 may detect the head direction of the electronic device 310 using a sensor, for example, a magnetic sensor, and may control to select the traffic light infrastructure corresponding to the detected head direction of the electronic device 310. Here, the head direction of the electronic device 310 may generally mean an upper end of the electronic device 310.

In an embodiment, as a method for selecting the traffic light infrastructure, the electronic device 310 may detect the selection of the traffic light infrastructure based on the movement direction of the electronic device 310. For example, if the movement of the electronic device 310 is detected through the motion detector (e.g., motion detector 410 of FIG. 4) or the location detector (e.g., location detector 420 of FIG. 4), the electronic device 310 may control to select the traffic light infrastructure corresponding to the movement direction of the electronic device 310 among the plurality of traffic light infrastructure.

In an embodiment, if one traffic light, for example, the first traffic light infrastructure 713, is selected among the plurality of traffic light infrastructures, for example, the first traffic light infrastructure 713 and the second traffic light infrastructure 715, based on the above-described touch input, voice signal, head direction of the electronic device 310, and/or movement direction of the electronic device 310, the electronic device 310, as denoted by reference number 720, may display the first traffic light infrastructure 721 selected distinctively from the second traffic light infrastructure 715 through applying of a visual effect, for example, a shading effect, to the first traffic light infrastructure 721. Further, the electronic device 310 may change the indicator 717 indicating the current location of the electronic device 310 displayed in a direction between the first traffic light infrastructure 713 and the second traffic light infrastructure 715 as denoted by reference number 710 to an indicator 723 that is changed to be directed toward the first traffic light infrastructure 721 as denoted by reference number 720, and display the changed indicator 723.

In an embodiment, if the first traffic light infrastructure 713 is selected, the electronic device 310 may transmit, to the first traffic light infrastructure 713, a message (e.g., PSM message) including information (e.g., current location information of the electronic device 310, intersection, and/or entry direction) related to the electronic device 310, and display a message 731 indicating that the request for the signal information related to the walking has been completed to the first traffic light infrastructure 713 as denoted by reference number 730.

Figure 8:
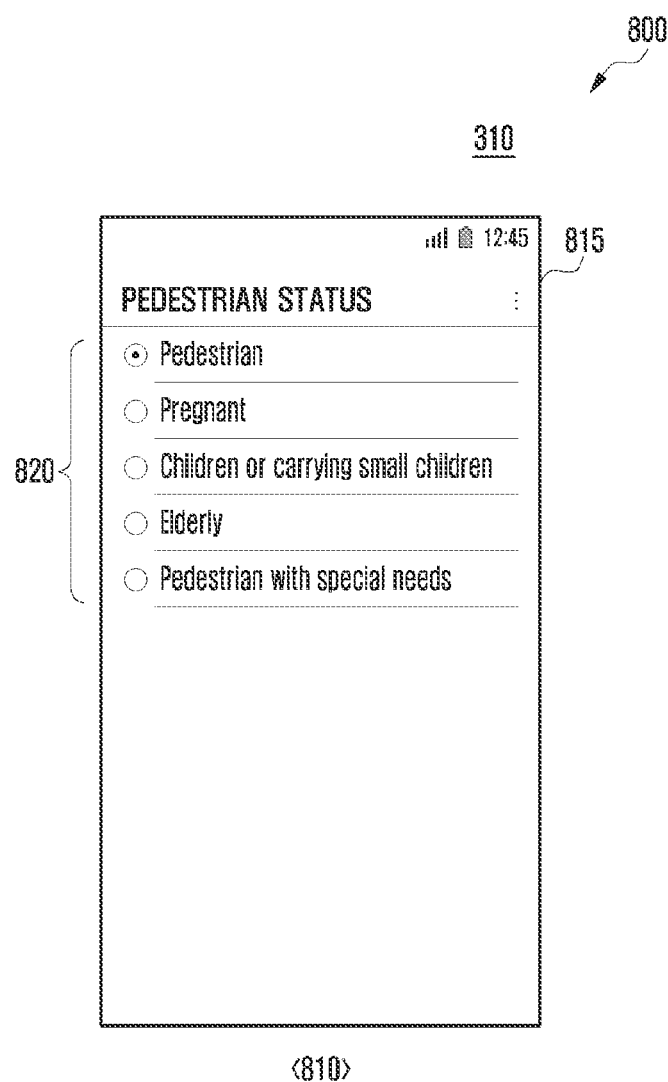
FIG. 8 is a diagram explaining a method for configuring information related to an electronic device according to various embodiments.

FIG. 8 is a diagram 800 explaining a method for configuring information related to an electronic device according to various embodiments.

Referring to FIG. 8, the electronic device 310, as denoted by reference number 810, may display, on the display (e.g., display device 160 of FIG. 1), a user interface 815 for configuring information related to the electronic device 310, for example, user (e.g., pedestrian) information. The user interface 815 for configuring the user information may include at least one option 820 for configuring the user characteristic. The at least one option 820 for configuring the user characteristic may include a pedestrian, a pregnant woman, children or pedestrian carrying small children, an elderly person, and/or a pedestrian with special needs. However, the options are not limited thereto.

In an embodiment, if selection of a pregnant woman is detected from the at least one option 820 for configuring the user characteristic, the electronic device 310 may generate and transmit a message (e.g., PSM message) including identification information of the pregnant woman to the external electronic device (e.g., first external electronic device 320 of FIG. 3).

The message generated by the electronic device 310 is not limited thereto, and although not illustrated, additional information may be input to the user characteristic. For example, if children are selected for the user characteristic, the electronic device 310 may provide additional options, such as an input field for inputting keys for the children and/or a check box for checking slow walking (slow moving). If a disabled is selected for the user characteristic, the electronic device 310 may provide the additional option capable of configuring a disabled type (e.g., visual impairment, hearing impairment, gait disorder, and/or cognitive impairment). In the option, the designated information may be included in the PSM message, and may be transmitted to the external electronic device.

Figure 9:
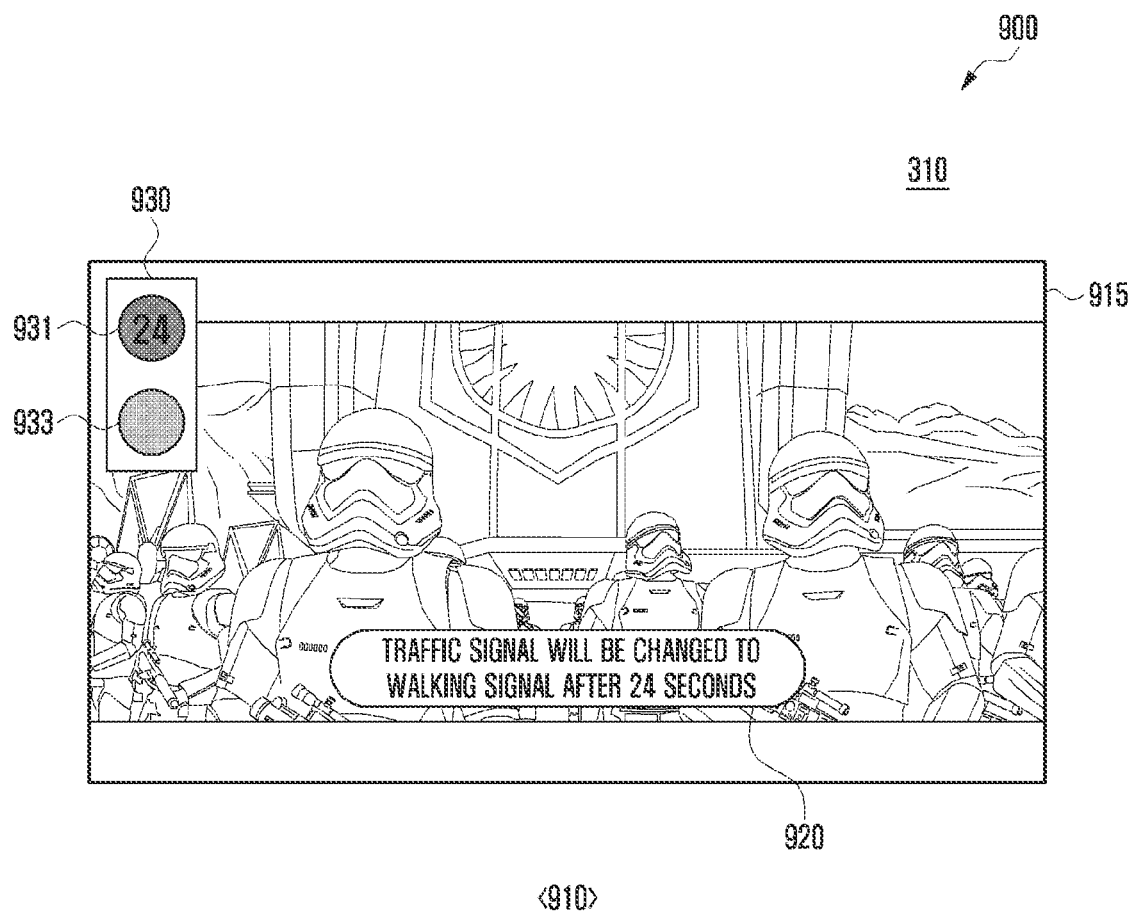
FIG. 9 is a diagram explaining a method for displaying a user interface for signal information related to walking received from an external electronic device according to various embodiments.

FIG. 9 is a diagram 900 explaining a method for displaying a user interface for signal information related to walking received from an external electronic device according to various embodiments.

Referring to FIG. 9, the electronic device 310, as denoted by reference number 910, may display a user interface 915 for signal information related to walking, which is received from the external electronic device (e.g., first external electronic device 320). For example, in case that the user (e.g., pedestrian) of the electronic device 310 does not see the external electronic device 320, for example, a traffic light signal, the electronic device 310 may display, on the display, the signal information related to the walking so that the user can perceive the traffic light information located in close proximity. In an embodiment, the state where the user does not see the signal of the external electronic device 320 may be determined based on the use stat of the electronic device 310. If the use state of the electronic device 310 is typing, playing game, reading, and/or viewing such as moving image, the electronic device 310 may determine this as a state where the user of the electronic device 310 does not see the signal of the external electronic device 320. The state determination is not limited thereto, and even in a situation where the external electronic device 320 is unable to receive the request for the signal information related to the walking from the electronic device 310, in a situation where the electronic device 310 does not perceive the signal waiting state, or in case that the pedestrian does not manually request the signal, the electronic device 310 may receive the signal information related to the walking from the external electronic device 320, and may display the user interface 915 for the received signal information related to the walking.

In an embodiment, in a situation where the user of the electronic device 310 is unable to see the signal, for example, in a situation where the user sees the display, the electronic device 310 may display the user interface 915, and thus can provide convenience to the user.

In an embodiment, the user interface 915 may include at least one of a message 920 (e.g., "Traffic signal will be changed to walking signal after 24 seconds") for the signal information related to the walking, or an indicator 930 including the signal state of the traffic lights, for example, a first signal 931 and a second signal 933. In case of displaying the signal information related to the walking through the indicator 930, the electronic device 310 may further display a remaining time (e.g., 24) until the traffic signal is changed to the walking signal.

In an embodiment, the electronic device 310 may display the signal information related to the walking at a designated time interval (e.g., interval of 5 seconds) or at a designated time (e.g., after initial once notification, re-notification may be performed in three seconds before the traffic signal is changed to the walking signal).

In an embodiment, if the changed walking signal (e.g., walking signal has been extended) is received from the external electronic device 320, the electronic device 310 may update and display the extended signal information.

In an embodiment, if it is detected that the user has crossed the crosswalk related to the external electronic device 320 transmitting the signal information related to the walking, for example, the traffic light infrastructure, based on the location information of the electronic device 310, the electronic device 310 may end the display of the user interface 915. In an embodiment, it has been described that the signal information related to the walking received from the external electronic device 320 is displayed through the user interface 915, but the display of the signal information is not limited thereto. If the use state of the electronic device 310 is music outputting, the electronic device 310 may audibly output the signal information related to the walking through a speaker provided in the electronic device 310 or a sound output device (e.g., speaker, earphone, headphone, and/or headset) connected to a connection terminal (e.g., connection terminal 178 of FIG. 1) of the electronic device 310, for example, an audio connector.

In another embodiment, the electronic device 310 may determine whether an object is detected within a designated distance from the display (e.g., display device 160 of FIG. 1) of the electronic device 310 through a proximity sensor (not illustrated). In an embodiment, the designated distance may be a distance adjacent to the display, and may mean a distance close to the point where the user is unable to identify the display due to the object that hides the display. For example, a case where the object is detected within the designated distance from the display may include a case where the display disposed on the front surface of the electronic device 310 is put toward the bottom (e.g., table) and/or is in a pocket or a bag, and a case where the object is located within the reference distance from the display.

In another embodiment, if the object is detected within the designated distance from the display, the electronic device 310 may output vibrations through the haptic module (e.g., haptic module 179 of FIG. 1). The user can know that the signal information related to the walking has been received through the output vibrations.

Figure 10:
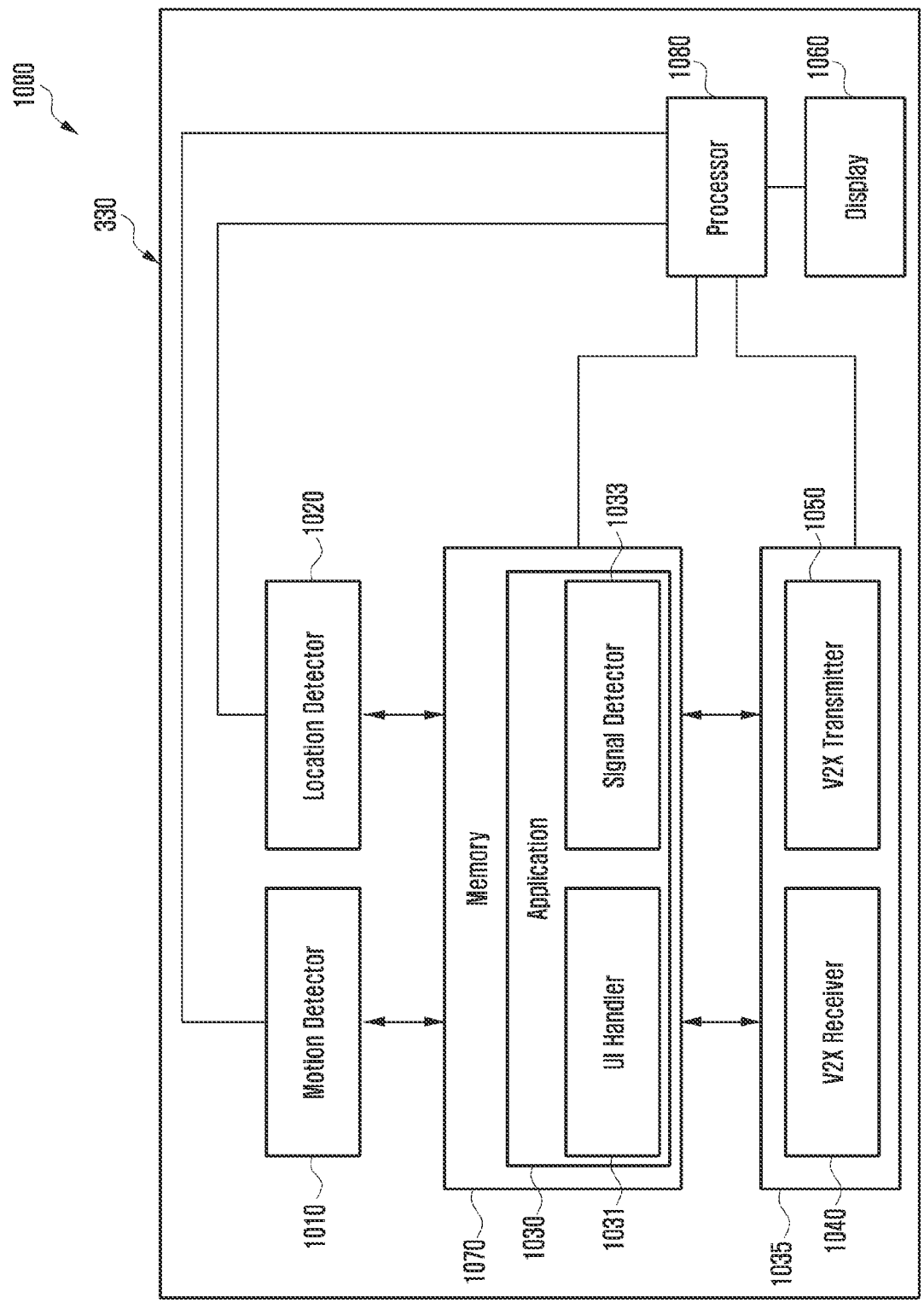
FIG. 10 is a block diagram illustrating an electronic device according to various embodiments.

FIG. 10 is a block diagram 1000 illustrating an electronic device according to various embodiments.

Referring to FIG. 10, the electronic device 330 (e.g., second electronic device 330 of FIG. 3) may include a motion detector 1010, a location detector 1020, a V2X module 1035 (e.g., WAVE module 210 of FIG. 2A), a display 1060 (e.g., display 212 of FIG. 2A), a memory 1070 (e.g., memory 240 of FIG. 2A), and/or a processor 1080 (e.g., AP 211 of FIG. 2A).

In an embodiment, the motion detector 1010 may detect the movement of the electronic device 330 using a sensor unit, for example, an acceleration sensor and a magnetic sensor.

In an embodiment, the location detector 1020 may obtain location information of the electronic device 330. The location detector 1020 may obtain the current location information of the electronic device 330 using a location sensor, for example, a global positioning system (GPS) or a network, for example, Wi-Fi or cell (cellular).

In an embodiment, the application 1030 may be stored in the memory 1070 as software, and for example, may include a UE handler 1031 or a signal detector 1033.

In an embodiment, if signal information related to walking or changed (e.g., extended) signal information related to the walking is received through a V2X receiver 1040 of the V2X module 1035, the UI handler 1031 may display, on the display 1060, a user interface related to the signal information related to the walking under the control of the processor 1080, or may display, on the display 1060, a user interface including a message for the reason why the signal has been changed.

In an embodiment, the signal detector 1033 may manage current signal information, next signal information, and location information of an external electronic device (e.g., first external electronic device 320 of FIG. 3), for example, infrastructure by analyzing a received V2X message.

In an embodiment, the V2X receiver 1040 and the V2X transmitter 1050 of the V2X module 1035 may transmit and receive the V2X message, support at least one communication technology among various communication technologies, such as WAVE or C-V2X, LTE D2D, or network, and communicate with the external electronic device 320.

In an embodiment, the electronic device (e.g., second external electronic device 330) 310 may include: a communication circuit (e.g., V2X module 1035); a display 1060; a processor 1080 operatively connected to the communication circuit 1035 and the display 1060; and a memory 1070 operatively connected to the processor 1080, wherein the memory 1070, when executed, stores instructions for causing the processor to: receive a message for signal information related to walking from a first external electronic device (e.g., first external electronic device 320) through the communication circuit (e.g., V2X receiver 1040), display a first user interface on the display 1060 based on the received signal information related to the walking, receive a message for signal information related to walking, having been changed in accordance with a designated condition, from the first external electronic device (e.g., first external electronic device 320) through the communication circuit (e.g., V2X receiver 1040) while displaying the first user interface, and display a second user interface on the display 1060 based on the changed signal information related to the walking.

In an embodiment, the designated condition may include at least one of location information of the second external electronic device (e.g., electronic device 310), motion information, or user type information of the second external electronic device (e.g., electronic device 310).

In an embodiment, the message for the changed signal information related to the walking may include extended signal information, and the instructions may cause the processor 1080 to display, on the display 1060, the second user interface including at least one of current signal information, a remaining time until a next signal, an indicator indicating a type of a pedestrian, a message for a reason why the signal information has been extended, or a map.

In an embodiment, the instructions may cause the processor 1080 to receive, from the first external electronic device (e.g., first external electronic device 320) through the communication circuit (e.g., V2X receiver 1040), at least one of a signal status message representing information on a request for current signal information and a status for the request, a message indicating map data, or a travel information message.

In an embodiment, the instructions may cause the processor 1080 to end a display of the first user interface or the second user interface in case that a designated time elapses while displaying the first user interface or the second user interface on the display 1060.

In an embodiment, the instructions may cause the processor 1080 to broadcast, at a designated time or in a designated period, a message for situation information related to the electronic device (e.g., second external electronic device 330) through the communication circuit (e.g., V2X transmitter 1050).

In an embodiment, the communication circuit may include at least one of a wireless access in vehicular environment (WAVE), cellular-vehicle to everything (C-V2X), LTE device-to-device (LTE D2D), or 5G.

Figure 11:
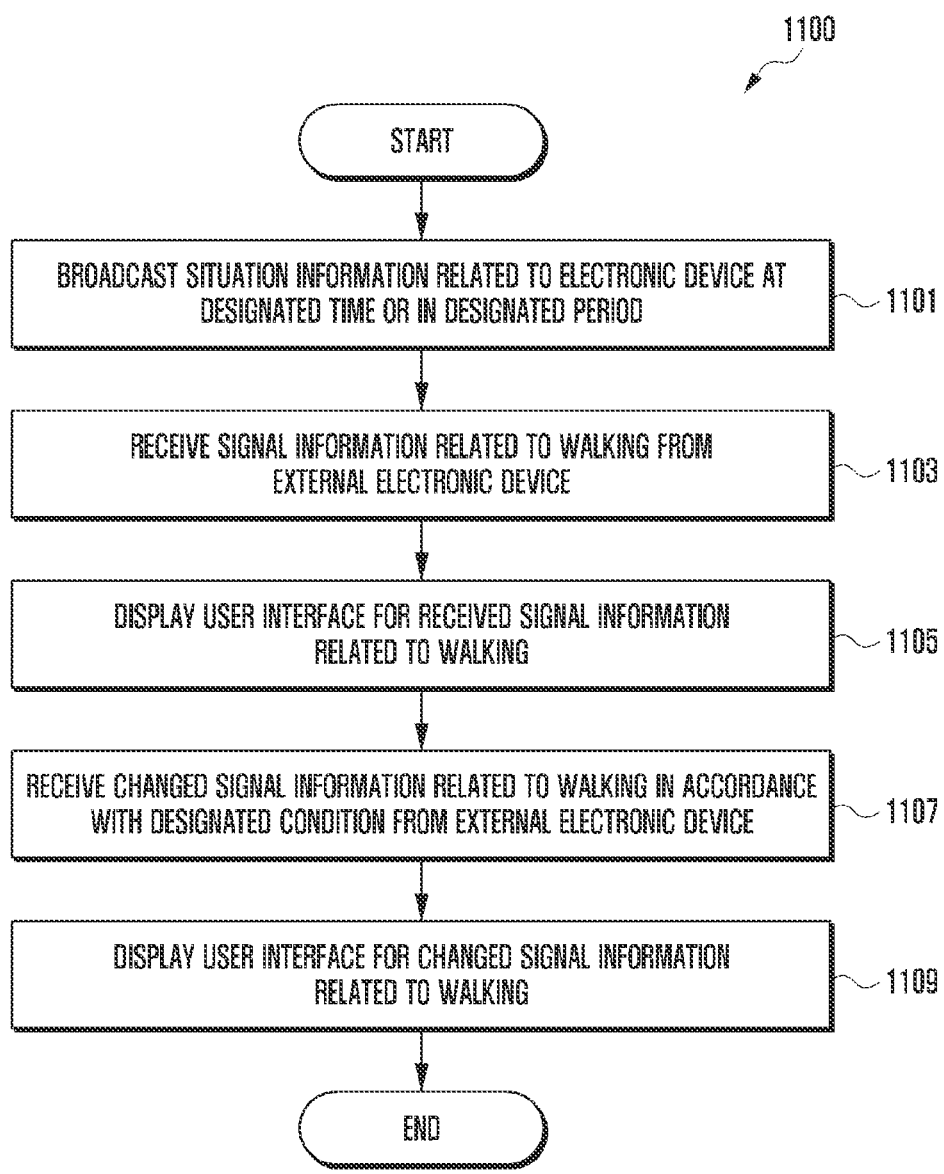
FIG. 11 is a flowchart explaining a method for providing a V2X service of an electronic device according to various embodiments.

FIG. 11 is a flowchart 1100 explaining a method for providing a V2X service of an electronic device according to various embodiments.

According to various embodiments, explanation will be mode under the assumption that an electronic device of FIG. 11 (e.g., second external electronic device 330 of FIG. 3) is an electronic device provided with a V2X module (e.g., V2X receiver 1040 and a V2X transmitter 1050) enabling WAVE communication, for example, a driver electronic device. In an embodiment, the driver electronic device may include an electronic device owned by the driver or an electronic device built in a vehicle, for example, a multimedia device (e.g., navigation).

Referring to FIG. 11, the electronic device 330, at operation 1101, may broadcast situation information related to the electronic device 330 at a designated time or in a designated period. The situation information related to the electronic device 330 may include status information of the electronic device 330, for example, vehicle status information (e.g., vehicle driving status information, vehicle destination information, and/or vehicle boarding information) and/or vehicle sensor information (e.g., vehicle location information, vehicle movement direction information, and/or vehicle speed information). For example, the electronic device 330 may be in a communication connected state with an on board unit (OBU) (not illustrated). The electronic device 330 may receive the situation information related to the electronic device 330 from the communication connected OBU. In an embodiment, the electronic device 330 may be communication-connected with at least one sensor device (not illustrated), and may receive the situation information related to the electronic device 330 from the at least one sensor device.

In an embodiment, the electronic device 330, at operation 1103, may receive signal information related to walking from the external electronic device (e.g., first external electronic device 320 of FIG. 3) (e.g., traffic light infrastructure). For example, the electronic device 330 may receive the signal information related to the walking from the external electronic device 320 through the communication circuit, for example, the V2X receiver (e.g., V2X receiver 1040 of FIG. 10).

In an embodiment, the electronic device 330, at operation 1105, may display a user interface for the received signal information related to the walking. For example, the signal information related to the walking may include the current signal state of the external electronic device 320 and/or the remaining time of the signal.

In an embodiment, the electronic device 330, at operation 1107, may receive the signal information related to the walking, which has been changed in accordance with the designated condition from the external electronic device 320. In an embodiment, the external electronic device 320 may change (e.g., extend) the current signal state in accordance with the designated condition, for example, pedestrian's situation. For example, if the type of the pedestrian (e.g., user of the electronic device 310 of FIG. 3) is, for example, an elderly person or children, the external electronic device 320 may extend the signal if it is determined that the pedestrian is unable to cross the crosswalk within the remaining time of the current signal based on the walking speed of the pedestrian.

In an embodiment, the electronic device 330, at operation 1109, may display the user interface for the changed signal information related to the walking. For example, the user interface for the changed signal related to the walking may include the current signal state, time information of the extended signal, and/or a message for the reason why the signal has been changed. If the changed signal information related to the walking is received, the user of the electronic device 330 may intuitively identify the reason why the signal has been extended through the display of the user interface for the changed signal related to the walking.

In another embodiment, in case of receiving only the changed signal information related to the walking (e.g., in case that the location of the electronic device 330 moves within a designated range after the electronic device 330 is out of the designated range from the external electronic device 320 for a predetermined time), the user may be unable to know the signal information related to the walking before the change. In this case, the electronic device 330 may not display the message for the reason why the signal has been changed on the user interface being displayed at operation 1109 as described above.

In an embodiment, a method for providing a V2X service of an electronic device (e.g., second electronic device 330 of FIG. 3) may include: receiving a message for signal information related to walking from an external electronic device 320 through a communication circuit (e.g., V2X receiver 1040 of FIG. 10); displaying a first user interface on a display based on the received signal information related to walking; receiving a message for signal information related to walking, having been changed in accordance with a designated condition, from the external electronic device through the communication circuit (e.g., V2X receiver 1040 of FIG. 10) while displaying the first user interface; and displaying a second user interface on the display based on the changed signal information related to walking.

In an embodiment, the designated condition may include at least one of location information of a second external electronic device (e.g., electronic device 310 of FIG. 3), motion information, or user type information of the second external electronic device (e.g., electronic device 310 of FIG. 3).

In an embodiment, the message for the changed signal information related to the walking may include extended signal information, and displaying the second user interface on the display may include displaying the second user interface including at least one of current signal information, a remaining time until a next signal, an indicator indicating a type of a pedestrian, a message for a reason why the signal information has been extended, or a map through a UI handler (e.g., UI handler 1031 of FIG. 10).

In an embodiment, the method for providing the V2X service of the electronic device 330 may further include receiving, from the external electronic device 310 through the communication circuit (e.g., V2X receiver 1040 of FIG. 10), at least one of a signal status message representing information on a request for current signal information and a status for the request, a message indicating map data, or a travel information message.

In an embodiment, the method for providing the V2X service of the electronic device may further include determining whether a designated time elapses while displaying the first user interface or the second user interface on the display, and ending the display of the first user interface or the second user interface in case that the designated time elapses.

In an embodiment, the method for providing the V2X service of the electronic device may further include broadcasting, at a designated time or in a designated period, a message for situation information related to the electronic device 330 through the communication circuit (e.g., V2X transmitter 1050).

FIG. 12 is a diagram 1200 explaining a method for displaying a user interface for changed signal information related to walking according to various embodiments.

Referring to FIG. 12, the electronic device (e.g., second external electronic device 330 of FIG. 3) may receive signal information related to walking, having been changed in accordance with a designated condition, from an external electronic device (e.g., first external electronic device 320 of FIG. 3). The external electronic device 320 may broadcast current signal information and next signal information at a designated time or in a designated period.

In an embodiment, the electronic device 330 may display a user interface including, for example, current signal state, time information of an extended signal, and/or a message for a reason why the signal has been changed based on the changed signal information related to the walking, being broadcasted from the external electronic device 320. For example, as denoted by reference numbers 1210 and 1250, the electronic device 330 may display user interfaces 1211 and 1255 including at least one of messages 1215 and 1260 for the reason why signal information has been changed, current signal states 1225 and 1265, remaining time 1220 and 1270 until next signals, indicators (e.g., avatar and icon) 1230 and 1275 indicating the type of a pedestrian, and/or map 1235.

Figure 13:
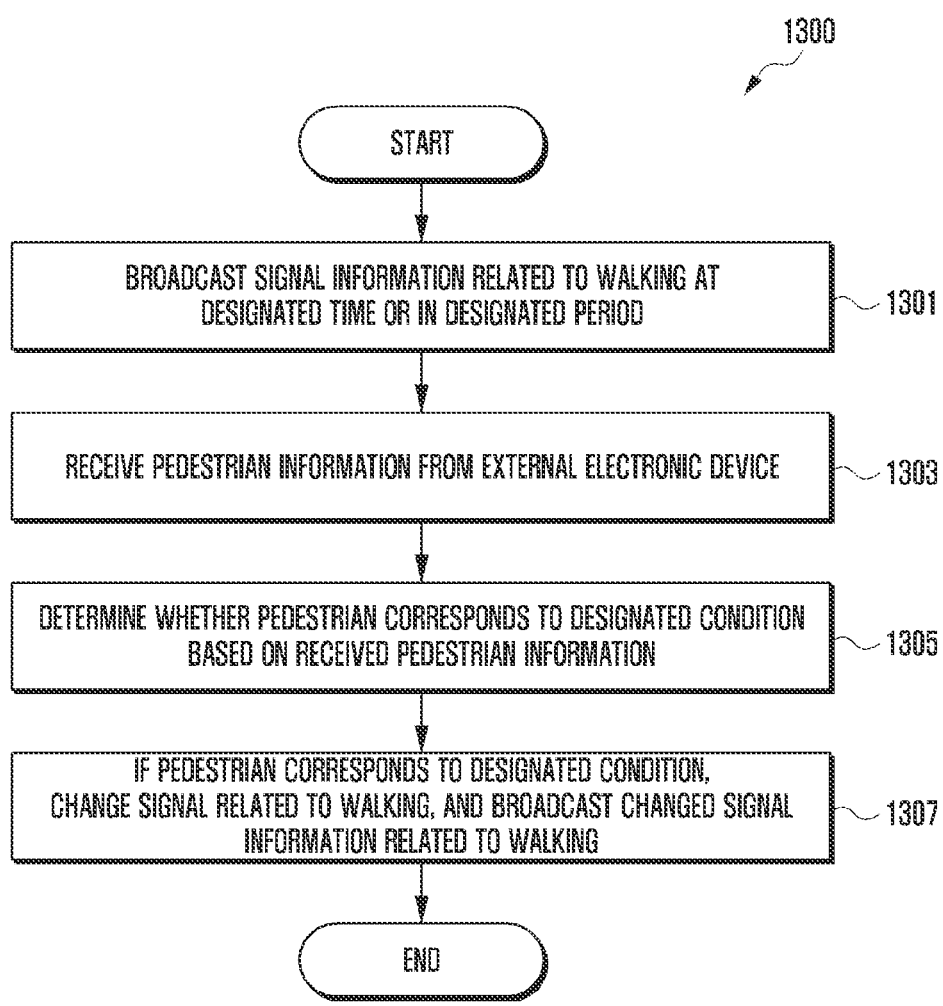
FIG. 13 is a flowchart explaining a method for providing a V2X service of an electronic device according to various embodiments.

FIG. 13 is a flowchart 1300 explaining a method for providing a V2X service of an electronic device according to various embodiments.

Explanation will be made under the assumption that the electronic device of FIG. 13 (e.g., first external electronic device 320 of FIG. 3) according to various embodiments is an external electronic device provided with a V2X module, for example, a road side unit (RSU) (e.g., traffic light infrastructure).

Referring to FIG. 13, the electronic device 320, at operation 1301, may broadcast signal information related to walking at a designated time or in a designated period. The signal information related to the walking may include a message (e.g., signal phase and timing (SPaT)) including the signal information related to the walking as shown in Table 4 and Table 5 based on the WAVE communication technology standards (e.g., J2735). In an embodiment, the electronic device 320 may broadcast the signal information related to the walking at the designated time or in the designated period through a communication circuit, for example, WAVE transmitter (not illustrated). For example, the signal information related to the walking may include a current signal state and/or a remaining time of the signal. As the message is broadcasted, the external electronic device (e.g., electronic device 310 of FIG. 3 or the second external electronic device 330) may receive the signal information related to the walking from the electronic device 320.

TABLE 4

| SPaT(signal phase and timing) intersection state (List) | Description | Remarks |
| --- | --- | --- |
| Name | Intersection region name | |
| id_Region | Intersection region ID | |
| id_id | Intersection entry direction ID | |
| msgCnt | Sequence number | |
| Status | Signal controller state | manualControlIsEnabled |
| | | stopTimeIsActivated |
| | | failureFlash |
| | | preemptIsActive |
| | | signalPriorityIsActive |
| | | fixedTimeOperation |
| | | trafficDependentOperation |
| | | standbyOperation |
| | | failureMode |
| | | off |
| | | recentMAPmessageUpdate |
| | | recentChangeInMAPassignedLanes IDsUsed |
| | | noValidMAPisAvailableAtThisTime |
| | | noValidSPATisAvailableAtThisTime |

TABLE 5

| SPaT(signal phase and timing) intersection state (List) | Description | Remarks |
| --- | --- | --- |
| Movement State_Name | Signal kind | STR, LEFT, PED, BYC, BUS |
| Movement State_signal group id | Signal kind ID | |
| Movement State_Movement Event_event state | Signal state | unavailable |
| | | dark |
| | | stop-Then-Proceed (Reds) |
| | | stop-And-Remain (Reds) |
| | | pre-Movement (Greens) |
| | | permissive-Movement-Allowed (Greens) |
| | | protected-Movement-Allowed (Greens) |
| | | permissive-clearance (Yellows/Ambers) |
| | | protected-clearance (Yellows/Ambers) |
| | | caution-Conflicting-Traffic (Yellows/Ambers) |
| Movement State_Movement Event_timing_min EndTime | Remaining time of signal | |
| Maneuver Assist_pedbicycle detect | Whether to detect pedestrian | |

In an embodiment, the electronic device 320 may broadcast, at the designated time or in the designated period, at least one of a signal status message representing information for a request for current signal information and a state for the request as shown in Table 6 based on the WAVE communication technology standards (e.g., J2735) in addition to the signal information related to the walking, a message indicating map data as shown in Table 7 and Table 8 so that users of the external electronic devices 310 and 330 can know the current location, for example, high-definition map information of the intersection (e.g., crosswalk location and/or lane direction), and/or a travel information message (TIM) as shown in Table 9 below.

TABLE 6

| Signal Status Message_Signal Status (List) | Description | Remarks |
|---|---|---|
| Signal Requester Info_Vehicle id | | |
| Signal Requester Info_Request id | | |
| Signal Requester Info_Msg count | | |
| Signal Requester Info_Basic Vehicle Role | | basic vehicle |
| | | public transport |
| | | special transport |
| | | dangerous goods |
| | | road work |
| | | road rescue |
| | | emergency |
| | | safety car |
| | | none(unknown) |
| | | truck |
| | | motorcycle |
| | | road side source |
| | | police |
| | | fire |
| | | ambulance |
| | | dot |
| | | transit |
| | | slow moving |
| | | stop n go |
| | | cyclist |
| | | pedestrian |

TABLE 6-continued

| Signal Status Message_Signal Status (List) | Description | Remarks |
|---|---|---|
| | | non motorized |
| | | military |
| In bound on | | |
| Out bound on | | |
| Prioritization Response Status | | unknown |
| | | requested |
| | | processing |
| | | watch other traffic |
| | | granted |
| | | rejected |
| | | max presence |
| | | reservice locked |

TABLE 7

| Map Data | Description | Remarks |
|---|---|---|
| msgCnt | sequence number | |
| layertype | map layer type | |
| Intersection Geometry_name | map name | |
| Intersection Geometry_id_region | region id | |
| Intersection Geometry_id_id | map unidirectional id | |
| Intersection Geometry_revision | Sequence number | map version |
| Intersection Geometry_ref Point_latitude | map center point latitude | |
| Intersection Geometry_ref Point_longitude | map center point longitude | |
| Intersection Geometry_ref Point_elevation | map center point altitude | |
| Intersection Geometry_lanewidth | map unidirectional width | |
| Intersection Geometry_lane set_Lane ID | lane ID | |
| Intersection Geometry_lane set_lane Attributes_directionalUse | lane direction | ingressPath egressPath |
| Intersection Geometry_lane set_lane Attributes_laneType | lane type | |

TABLE 8

| Map Data | Description | Remarks |
|---|---|---|
| Intersection Geometry_lane set_maneuvers | Behavior allowed to lane | maneuverStraightAllowed maneuverLeftAllowed maneuverRightAllowed maneuverUTurnAllowed maneuverLeftTurnOnRedAllowed maneuverRightTurnOnRedAllowed maneuverLaneChangeAllowed maneuverNoStoppingAllowed yieldAlwaysRequired goWithHalt caution reserved1 |
| Intersection Geometry_lane set_nodeSetXY(List)_delta x | Lane coordinate offset x | node-XY6 |
| Intersection Geometry_lane set_nodeSetXY(List)_delta y | Lane coordinate offset y | node-XY6 |
| Intersection Geometry_lane set_nodeSetXY(List)_attributes_localNode | Coordinate characteristic | |
| Intersection Geometry_lane set_connectsTo_connectingLane_laneid | Connected laneid | |
| Intersection Geometry_lane set_connectsTo_connectingLane_maneuvers | Maneuvers for connected laneid | |
| Intersection Geometry_lane set_connectsTo_signalGroup | Connected signal kind id | |

TABLE 9

| TIM(traveler information message) | Description | Remarks |
| --- | --- | --- |
| msgCnt | sequence number | |
| data frames_frameType | TIM type | advisory |
| | | road Signage |
| | | commercial Signage |
| data frames_msgId | msg ID | furtherInfoID |
| | | roadSignID |
| data frames_startYear | starting year (UTC) | generated message year |
| data frames_startTime | starting time (UTC) | created message creation time (minute) |
| data frames_durationTime | duration | created message duration (minute) |
| data frames_priority | priority | |
| data frames_regions_anchor (lat, long, elevation) | latitude, longitude, altitude | |
| data frames_regions_laneWidth | road width | |
| data frames_regions_direction | offer direction | heading slice |
| data frames_regions_path (NodeLL(Lon, Lat)) | longitude, latitude | node-LatLon node-LatLon |
| data frames_content_type | content type | advisory |
| | | workZone |
| | | genericSign |
| | | speedLimit |
| | | exitService |
| data frames_content_value | value | String or ITIS Code |

In an embodiment, the electronic device 320, at operation 1303, may receive pedestrian information from the external electronic device (e.g., electronic device 310 of FIG. 3). The electronic device 320 may receive a message (e.g., personal safety message (PSM) including the pedestrian information according to Table 1 to Table 3 as described above from the external electronic device 310 through the communication circuit, for example, the V2X receiver (not illustrated). For example, the PSM may include information on a pedestrian type (e.g., pregnant woman or children), whether the pedestrian is currently crossing the crosswalk, and/or whether the pedestrian is in a signal waiting state.

In an embodiment, the electronic device 320 may receive the PSM from the external electronic device 310 at a designated time or in a designated period. The electronic device 320 may perceive the movement state of the pedestrian based on the PSM being received at the designated time or in the designated period. However, the operation of the electronic device 320 is not limited thereto, and if the PSM is not received from the external electronic device (e.g., a situation in which the PSM is unable to be received), the electronic device 320 may perceive whether the pedestrian is crossing the crosswalk through communication with a device capable of determining whether the object crossing the crosswalk is a person or a vehicle. In another embodiment, in case that the electronic device 320 is separately provided with a camera (e.g., camera module 180 of FIG. 1), the electronic device 320 can perceive the object crossing the crosswalk and/or whether the object is crossing the crosswalk through an image sensor included in the camera.

In an embodiment, the electronic device 320, at operation 1305, may determine whether the pedestrian corresponds to a designated condition based on the pedestrian information being received from the external electronic device 310. For example, if it is determined that the pedestrian is walking based on the pedestrian information, the electronic device 320 may determine whether the pedestrian is a pedestrian who requires the signal control. The pedestrian who requires the signal control may include a pedestrian who is unable to cross the crosswalk within a designated time, such as a pregnant woman, children, an elderly person, and/or disabled.

In an embodiment, if the pedestrian corresponds to the designated condition, the electronic device 320, at operation 1307, may change the signal related to the walking, and may broadcast the changed signal information related to the walking. For example, the electronic device 320 may detect that the pedestrian is walking in a walking signal situation, and if it is determined that the pedestrian corresponds to the designated condition (e.g., the pedestrian is unable to cross the crosswalk within the designated time), the electronic device 320 may extend the signal. Accordingly, since the signal is extended in a situation in which the pedestrian is unable to cross the crosswalk within the designated time, the pedestrian can safely cross the crosswalk.

In an embodiment, the electronic device 320 may modify the message (e.g., SPaT) including the signal information related to the walking into changed signal information related to the walking in accordance with the designated condition, and then may broadcast the changed signal information.

In an embodiment, the electronic device 320 may include the reason why the signal has been changed in the message (e.g., SPaT) including the signal information related to the walking, and may broadcast the message.

In an embodiment, as the message is broadcasted, the external electronic devices 310 and 330 may receive the changed signal information related to the walking from the electronic device 320. As the changed signal information related to the walking is received, the users of the external electronic devices 310 and 330 can intuitively identify the changed signal information and the reason why the signal has been changed.

In an embodiment, it has been described that the signal change is performed by the electronic device 320, but the performing of the signal change is not limited thereto. The electronic device 320 may transmit the current signal information and the pedestrian information to a control center by accessing a server. If the signal information controlled by the control center (e.g., changed signal information) is received, the electronic device 320 may broadcast a message (e.g., SPaT) including at least one of the received changed signal information or the reason why the signal has been changed.

In an embodiment, it has been described that the electronic device 320 changes the signal related to the walking in case that the pedestrian corresponds to the designated condition based on the received pedestrian information, but the change of the signal related to the walking is not limited thereto. In another embodiment, the electronic device 320 may determine whether the pedestrian can cross the crosswalk within the remaining walking time based on the remaining walking time in the walking signal situation. For example, if it is determined that the pedestrian is unable to cross the crosswalk within the remaining time of the current signal based on the speed of the external electronic device 310, for example, the walking speed of the pedestrian, the electronic device 320 may display a user interface for guiding not to enter the crosswalk. As guiding for the pedestrian not to enter the crosswalk, it is possible to protect the pedestrian in a dangerous situation in which the pedestrian is unable to cross the crosswalk within the designated time.

Figure 14:
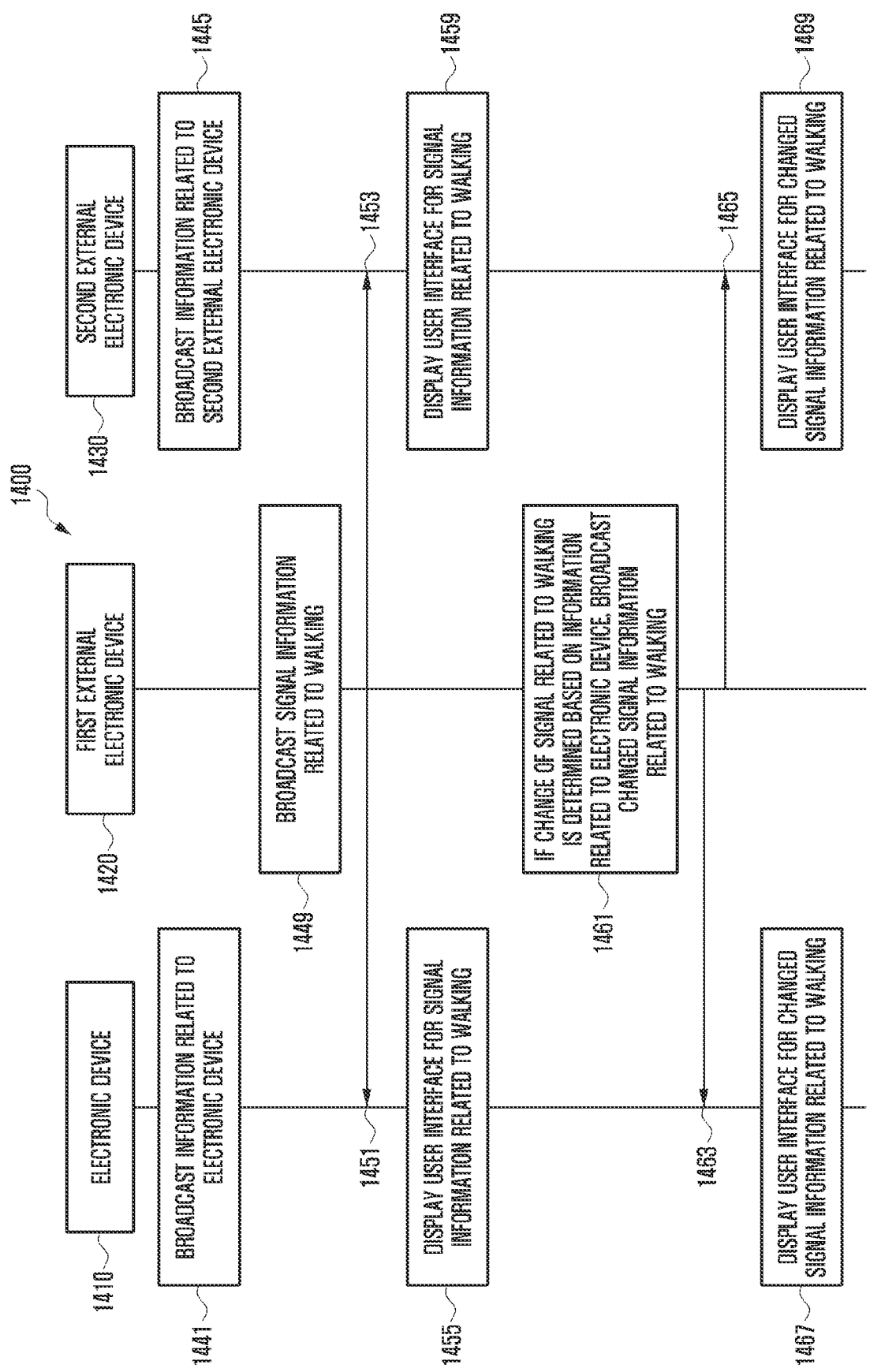
FIG. 14 is a diagram illustrating signal flow among electronic devices according to various embodiments.

FIG. 14 is a diagram 1400 illustrating signal flow among electronic devices according to various embodiments.

Explanation will be made under the assumption that according to various embodiments, each of an electronic device 1410 (e.g., electronic device 310 of FIG. 3), a first external electronic device 1420 (e.g., first external electronic device 320 of FIG. 3), and a second external electronic device 1430 (e.g., second electronic device 330 of FIG. 3) is a pedestrian electronic device, a traffic light infrastructure, or a driver electronic device provided with a V2X module enabling communication in accordance with the WAVE communication standards.

Referring to FIG. 14, the electronic device 1410, at operation 1441, may broadcast situation information related to the electronic device 1410 at a designated time or in a designated period. At operation 1445, the second external electronic device 1430 may broadcast information related to the second external electronic device 1430 at the designated time or in the designated period. The first external electronic device 1420 may receive information being broadcasted from the electronic device 1410 and the second external electronic device 1430 at the designated time or in the designated period.

In an embodiment, the first external electronic device 1420, at operation 1449, may broadcast signal information related to the walking at the designated time or in the designated period.

According to an embodiment, although it has been described that the operation 1441, the operation 1445, and the operation 1449 are performed in order, the operation 1441, the operation 1445, and the operation 1449 may be simultaneously performed.

In an embodiment, the electronic device 1410 and the second external electronic device 1430, at operation 1451 and operation 1453, may receive the signal information related to the walking from the first external electronic device 1420. For example, the electronic device 1410 and the second external electronic device 1430 may receive the signal information related to the walking from the first external electronic device 1420 through a communication circuit, for example, the V2X module.

In an embodiment, although not illustrated, the electronic device 1410 may configure whether to receive the signal information related to the walking, and may or may not receive the signal information related to the walking, being broadcasted from the first external electronic device 1420 depending on the configuration.

In an embodiment, the electronic device 1410, at operation 1455, may display a user interface for the signal information related to the walking.

In an embodiment, in case that the signal information is a walking signal, the second external electronic device may be waiting for the signal.

In an embodiment, the second external electronic device 1430, at operation 1459, may display the user interface for the signal information related to the walking.

In an embodiment, if it is determined to change the signal related to the walking based on the information related to the electronic device 1410, being received from the electronic device 1410 at the designated time or in the designated period, the first external electronic device 1420, at operation 1461, may broadcast the changed signal information related to the walking. Since the operation 1461 is equal to the operation 1305 and the operation 1307 of FIG. 13 as described above, the detailed explanation thereof will be omitted.

In an embodiment, the electronic device 1410 and the second external electronic device 1430 may receive the changed signal information related to the walking, being broadcasted from the first external electronic device 1420 at operation 1463 and operation 1465, and may display user interfaces for the changed signal information related to the walking at operation 1467 and operation 1469. For example, the user interface for the changed signal information related to the walking, being displayed on the second external electronic device 1430, may include at least one of the changed signal information or the message for the reason why the signal has been changed. The user interface for the changed signal information related to the walking may include only the changed signal information.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStor™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device operatively coupled to a vehicle, the electronic device comprising:
   a communication circuit;
   a display;
   a processor operatively connected to the communication circuit and the display; and
   a memory operatively connected to the processor,
   wherein the memory stores instructions which, when executed, cause the processor to:
   receive, through the communication circuit, a first message comprising first traffic signal information related to walking, from an external electronic device,
   provide first information based on the first traffic signal information,
   receive, through the communication circuit, a second message comprising second traffic signal information related to walking, from the external electronic device, the second traffic signal information being generated in accordance with a designated condition, and
   provide second information based on the second traffic signal information; and wherein the second traffic signal information comprises extended traffic signal information.

2. The electronic device of claim 1, wherein the designated condition comprises at least one of location information of a second external electronic device, motion information, or user type information of a user of the second external electronic device.

3. The electronic device of claim 1,
   wherein the instructions cause the processor to display, on the display, a user interface including at least one of current traffic signal information, a remaining time until a next traffic signal, an indicator indicating a type of a pedestrian, a message about a reason for extending the traffic signal or a map.

4. The electronic device of claim 1, wherein the instructions cause the processor to receive, from the external electronic device through the communication circuit, at least one of a signal status message representing information on a request for current signal traffic information and a status for the request, a message indicating map data, or a travel information message.

5. The electronic device of claim 1, wherein the instructions cause the processor to broadcast, at a designated time or in a designated period, a third message including situation information related to the electronic device, through the communication circuit.

6. The electronic device of claim 1, wherein the communication circuit comprises at least one of a wireless access in vehicular environment (WAVE), cellular-vehicle to everything (C-V2X), LTE device-to-device (LTE D2D), or 5G.

7. A method for providing a V2X service of an electronic device operatively coupled to a vehicle, the method comprising:
   receiving, through a communication circuit, a first message comprising first traffic signal information related to walking, from an external electronic device;
   providing first information based on the first traffic signal information;
   receiving, through the communication circuit, a second message comprising second traffic signal information related to walking from the external electronic device, the second signal traffic information being generated in accordance with a designated condition;
   providing second information based on the second traffic signal information; and
   wherein the second traffic signal information includes extended traffic signal information.

8. The method of claim 7, wherein the designated condition includes at least one of location of a second external electronic device, motion information, or user type information of a user of the second external electronic device, and wherein providing second information based on the second traffic signal information comprising including at least one of current traffic signal information, a remaining time until a next traffic signal, an indicator indicating a type of a pedestrian, a message about a reason for extending the traffic signal or a map.

9. The method of claim 7, further comprising broadcasting, at a designated time or in a designated period, a third message including situation information related to the electronic device through the communication circuit.

10. An electronic device for a pedestrian, the electronic device comprising:

a communication circuit;

a display;

a processor operatively connected to the communication circuit and the display; and a memory operatively connected to the processor, wherein the memory stores instructions which, when executed, cause the processor to:

receive, through the communication circuit, a first message comprising first traffic signal information related to walking, from an external electronic device, wherein the first traffic signal information includes current traffic signal information, provide first information based on the first traffic signal information, broadcast, through the communication circuit, at a designated time or in a designated period, a second message comprising second information related to the electronic device, wherein the second information includes type information of a user of the electronic device location information, and motion information, receive, through the communication circuit, a third message comprising second traffic signal information related to walking, from an external electronic device, wherein the second traffic signal information includes extended traffic signal information generated based on the broadcasted second information, and provide third information based on the second traffic signal information.

11. The electronic device of claim 10, wherein the instructions cause the processor to:

provide a first user interface for configuring whether to receive traffic signal information related to the walking from the external electronic device, wherein the first information or the third information is provided based on being configured to receive the traffic signal information from the external electronic device via the first user interface.

12. The electronic device of claim 11, wherein the instructions cause the processor to:

display a second user interface for selecting one external electronic device based on the traffic signal information being received from a plurality of external electronic devices, detect selection of the one external electronic device through the second user interface, transmit, through the communication circuit, at the designated time or for the designated period, the second message for the information related to the electronic device to the selected external electronic device, and receive, through the communication circuit, the third message from the selected external electronic device.

13. The electronic device of claim 10, wherein the instructions cause the processor to:

determine, based on receiving the first message, whether the electronic device is located within a designated range from the external electronic device, and provide first information based at least partly on a result of the determination.

14. The electronic device of claim 10, wherein the first traffic signal information further includes at least one of location information of the external electronic device or a remaining time of the current signal, and wherein the second traffic signal information includes at least one of direction information of the electronic device, information on whether to cross a road, or information on whether to receive traffic signal information.

* * * * *